(12) United States Patent
Hidaka

(10) Patent No.: US 7,004,281 B2
(45) Date of Patent: Feb. 28, 2006

(54) STEERING APPARATUS FOR USE IN AN AUTOMOTIVE VEHICLE AND EQUIPPED WITH A TRANSMISSION RATIO ADJUSTING MECHANISM

(75) Inventor: Kenichiro Hidaka, Aichi-ken (JP)

(73) Assignee: Denso Corporation, Kariya (JP)

(*) Notice: Subject to any disclaimer, the term of this patent is extended or adjusted under 35 U.S.C. 154(b) by 44 days.

(21) Appl. No.: 10/864,442

(22) Filed: Jun. 10, 2004

(65) Prior Publication Data
US 2005/0039974 A1 Feb. 24, 2005

(30) Foreign Application Priority Data
Aug. 20, 2003 (JP) ............................. 2003-296843

(51) Int. Cl.
*G06F 7/00* (2006.01)
(52) U.S. Cl. .................... 180/446; 180/444; 180/422
(58) Field of Classification Search ............. 180/417, 180/421, 422, 443, 444, 446; 701/41, 42, 701/43, 36
See application file for complete search history.

(56) References Cited

U.S. PATENT DOCUMENTS 6,164,150 A * 12/2000 Shindo et al. ............. 180/444
6,718,242 B1 * 4/2004 Mori et al. ................ 701/41
6,840,347 B1 * 1/2005 Nakatsu et al. ............ 180/444
6,868,933 B1 * 3/2005 Kameya ..................... 701/41

FOREIGN PATENT DOCUMENTS

JP 11-34894 2/1999

* cited by examiner

Primary Examiner—Lesley D. Morris
Assistant Examiner—Matthew Luby
(74) Attorney, Agent, or Firm—Posz Law Group, PLC

(57) ABSTRACT

A transmission ratio of a rotational angle of an output shaft to a rotational angle of an input shaft is adjustable by a transmission ratio changing mechanism when a coupling member is in a unlocked position. A resilient member urges the coupling member toward the locked position. A solenoid holds the coupling member at the unlocked position against a resilient force of the resilient member. A solenoid drive control apparatus applies a drive voltage to the solenoid to hold the coupling member positioned at the unlocked position and reduces the drive voltage through a voltage attenuation process before the coupling member finally reaches the locked position. During the voltage attenuation process, the solenoid produces an electromagnetic force yielding to the resilient force of the resilient member and decreases a shifting speed of the coupling member on the way to the locked position.

4 Claims, 12 Drawing Sheets

STEERING APPARATUS FOR USE IN AN AUTOMOTIVE VEHICLE AND EQUIPPED WITH A TRANSMISSION RATIO ADJUSTING MECHANISM

BACKGROUND OF THE INVENTION

The present invention relates to a steering apparatus equipped with a transmission ratio adjusting mechanism (hereinafter, referred to as a transmission ratio adjustable steering apparatus) that is preferably employed in automotive vehicles and is capable of changing a transmission ratio of a steered angle of a steerable wheel or tire to a steering angle of a steering wheel controlled or manipulated by a driver or an operator.

Some of advanced automotive steering control apparatuses employ a transmission ratio changing mechanism, such as Variable Gear Ratio Steering (VGRS), that can change a steering angle conversion ratio (i.e. a transmission ratio of a steered angle of a steerable wheel to a steering angle of a steering wheel). In general, it is desirable to change the steering angle conversion ratio with reference to vehicle driving conditions including a vehicle traveling speed. For example, when a vehicle is traveling at a higher speed, the steering angle conversion ratio should be decreased to avoid rapid change in the steered angle of the wheel relative to a steering angle of the steering wheel controlled or manipulated by a driver because the traveling performance of the vehicle is stabilized at higher speeds.

On the other hand, when the vehicle is traveling at a lower speed, it is desirable to increase the steering angle conversion ratio in order to reduce a required minimum steering angle of the steering wheel when a driver must manage to put his/her vehicle into a garage or into a limited parking space and accordingly in order to reduce the burden of a driver who must control or manipulate the steering wheel.

Conventionally, many motor type steering mechanisms are widely used for adjusting the steering angle conversion ratio because they are excellent in independently rotating and driving a steered wheel shaft. More specifically, an angle detecting section is provided to detect a steering angle of a steering wheel controlled or manipulated by a driver. The steering angle conversion ratio is determined based on the detected steering angle of the steering wheel and actual vehicle driving conditions. Through computer processing, a finally required wheel steering angle (i.e. target wheel angle) is calculated based on the determined steering angle conversion ratio. Then, the steered wheel shaft, mechanically separated from the steering shaft of the steering wheel, is rotated or driven by the motor so as to adjust the angle of the steerable wheel to the target wheel angle.

According to this kind of steering control system, the steered wheel shaft is follow-up controlled so as to accurately agree with a rotation of the steering shaft. More specifically, the rotational speed of a steered wheel shaft driving motor is adjusted in accordance with a difference between an actual rotational angle of the steered wheel shaft (i.e. actual wheel steering angle) and a target wheel steering angle. The follow-up control should be performed speedily so that the actual steering shaft angle agrees with a target steering angle as quick as possible. However, to avoid undesirable overshoot phenomenon occurring during a final stage of this kind of follow-up control, it is necessary to sufficiently decelerate and accurately control a rotational speed of the motor. On the other hand, a driver may suddenly turn the steering wheel to avoid immediate danger. In such a case, the motor must rotate at a very high speed.

Furthermore, a transmission ratio changing mechanism may include a locking apparatus, according to which the transmission ratio is mechanically fixed to a predetermined value in case of failure occurring in the transmission ratio changing mechanism. For example, a locking apparatus includes an arch-shaped locking arm swingably supported to a motor housing of the transmission ratio changing mechanism. And, a disc-shaped lock holder is fixed around a rotor shaft. The locking arm has a projection selectively engageable with a recess of this lock holder. When the projection of the locking arm engages with the rotor shaft, the relative rotation between the motor housing and the rotor shaft is locked. Accordingly, in a case that the engine is stopped or in an event that an excessive force is applied to the transmission ratio changing mechanism, the locking apparatus is brought into a locked condition to surely maintain the accurate and regulated relationship between the steering angle of the steering wheel and a steered angle of the steerable wheel. (Refer to Japanese Patent Application Laid-open No. 11-34894).

However, according to the transmission ratio adjustable steering apparatus disclosed in the above-described prior art, there is a drawback such that the locking arm and the lock holder make uncomfortable noises when they engage to bring the locking apparatus into the lock condition.

SUMMARY OF THE INVENTION

In view of the foregoing problems, the present invention has an object to provide a transmission ratio adjustable steering apparatus that is capable of suppressing noise sounds generating from a transmission ratio changing mechanism, for example, when a locking arm engages with a lock holder in the locking operation of a locking mechanism.

In order to accomplish the above and other related objects, the present invention provides a transmission ratio adjustable steering apparatus, including an input shaft, an output shaft, a transmission ratio changing mechanism, a coupling member, a resilient member, a solenoid, and a solenoid drive control apparatus. The input shaft is connected to a steering wheel. An output shaft is connected to a steerable wheel. A transmission ratio changing mechanism changes a ratio of a rotational angle of the output shaft to a rotational angle of the input shaft. A coupling member (e.g. locking arm) is shiftable between a locked position (i.e. the position of a lock holder) and an unlocked position. The input shaft and the output shaft integrally rotate when the coupling member is in the locked position, while the input shaft and the output shaft are released from a coupling condition and brought into an unlocked condition. The transmission ratio of the rotational angle of the output shaft to the rotational angle of the input shaft is adjustable by the transmission ratio changing mechanism when the coupling member is in the unlocked position. The resilient member resiliently urges the coupling member toward the locked position. The solenoid holds the coupling member at the unlocked position against a resilient force of the resilient member. And, the solenoid drive control apparatus applies a drive voltage to the solenoid to hold the coupling member positioned at the unlocked position and reduces the drive voltage through a voltage attenuation process before the coupling member finally reaches the locked position. During the voltage attenuation process, the solenoid produces an electromagnetic force yielding to the resilient force of the resilient member and decreases a shifting speed of the coupling member on the way to the locked position.

According to a preferred embodiment of the present invention, the solenoid drive control apparatus, in the process of shifting the coupling member from the unlocked position to the locked position, gradually reduces the drive voltage applied to the solenoid to allow the coupling member to finally reach the locked position.

In general, noise sounds generating from the coupling member will be roughly proportional to an impact force generated by the coupling member. Furthermore, an impact force of the coupling member is proportional to the square of its shifting speed. Therefore, noise sounds can be suppressed by decreasing the shifting speed of this coupling member.

In a practical control, even if the voltage applied to the solenoid is reduced to zero to shift the coupling member from the unlocked position to the locked position, the drive voltage of the solenoid does not decrease to zero immediately due to its inductance component and resistance component. However, it is effective to control a reduction rate of the voltage applied to the solenoid to be smaller than a reduction rate of the voltage caused due to its inductance component and resistance component in realizing a slower shifting speed of the coupling member and accordingly in suppressing noise sounds, compared with a case that a voltage applied to the solenoid is suddenly dropped to zero (refer to FIG. 5A).

Furthermore, it is preferable that the solenoid drive control apparatus, in the process of shifting the coupling member from the unlocked position to the locked position, reduces the drive voltage applied to the solenoid so that an electromagnetic force of the solenoid balances with a resilient force of the resilient member at a near side of the locked position to momentarily stop the coupling member at the near side before the coupling member reaches the locked position, and then finally decreases a value of the drive voltage to zero.

Even when the voltage applied to the solenoid is controlled so as to shift the coupling member from the unlocked position to the locked position, an actual drive voltage of the solenoid cannot be immediately adjusted to an applied voltage value due to inductance component and resistance component of the solenoid. However, momentarily stopping the coupling member makes it possible to reduce a delay in the change of the drive voltage applied to the solenoid. Furthermore, when the voltage finally applied to the solenoid reduces zero at a time the coupling member has not yet reached the locked position, an impact force of the coupling member is substantially proportional to a product of an elastic modulus of the resilient member and a shift distance of the coupling member. Thus, noise sounds generating from the coupling member in its locking operation become small.

If the shifting speed of the coupling member is slow in the process of shifting the coupling member from the unlocked position to the locked position, noise sounds generating from the coupling member in its locking operation are small but a long time is required for accomplishing the locking operation. In this respect, employing the above-described arrangement is effective in not only suppressing noise sounds but also in shortening a required operation time, compared with a case that the voltage applied to the solenoid is simply reduced.

More specifically, according to a preferred embodiment of the present invention, a housing integrally rotates with the input shaft. The transmission ratio changing mechanism is a transmission ratio changing motor that is fixed in the housing and has a rotary shaft for transmitting motor rotation to the output shaft via a speed reduction gear unit. A rotary member is formed coaxially and integrally with the rotary shaft of the transmission ratio changing motor and has at least one engaging recess formed on an outer circumferential surface thereof. The coupling member has an engaging hook that is attached to the housing so as to oppose to the outer circumferential surface of the rotary member and is shiftable between the locked position and the unlocked position. The engaging hook engages with the engaging recess in the locked position. The engaging hook disengages from the engaging recess in the unlocked position so that a predetermined distance is kept between the engaging hook and the outer circumferential surface of the rotary member. The resilient member resiliently urges the coupling member toward the locked position where the engaging hook of the coupling member engages with the engaging recess of the rotary member. The solenoid, when activated, shifts the coupling member against the resilient force of the resilient member and holds the coupling member at the unlocked position where the engaging hook of the coupling member disengages from the engaging recess of the rotary member and keeps a predetermined distance from the outer circumferential surface of the rotary member. And, the solenoid drive control apparatus, in the voltage attenuation process, causes the coupling member held at the unlocked position to shift toward the locked position based on the resilient force of the resilient member, thereby integrating the input shaft with the rotary shaft of the transmission ratio changing motor via the housing, and causing the input shaft and the output shaft to rotate integrally via the speed reduction gear unit.

The above-described arrangement is effective in realizing the transmission ratio adjustable steering apparatus that is capable of suppressing noise sounds generating when the coupling member is brought into the locked position and also capable of firmly locking the input shaft (i.e. the steering shaft) with the output shaft (i.e. the steered wheel shaft) so that they rotate integrally.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Hereinafter, preferred embodiments of the present invention will be explained with reference to attached drawings.

First Embodiment

Figure 1:
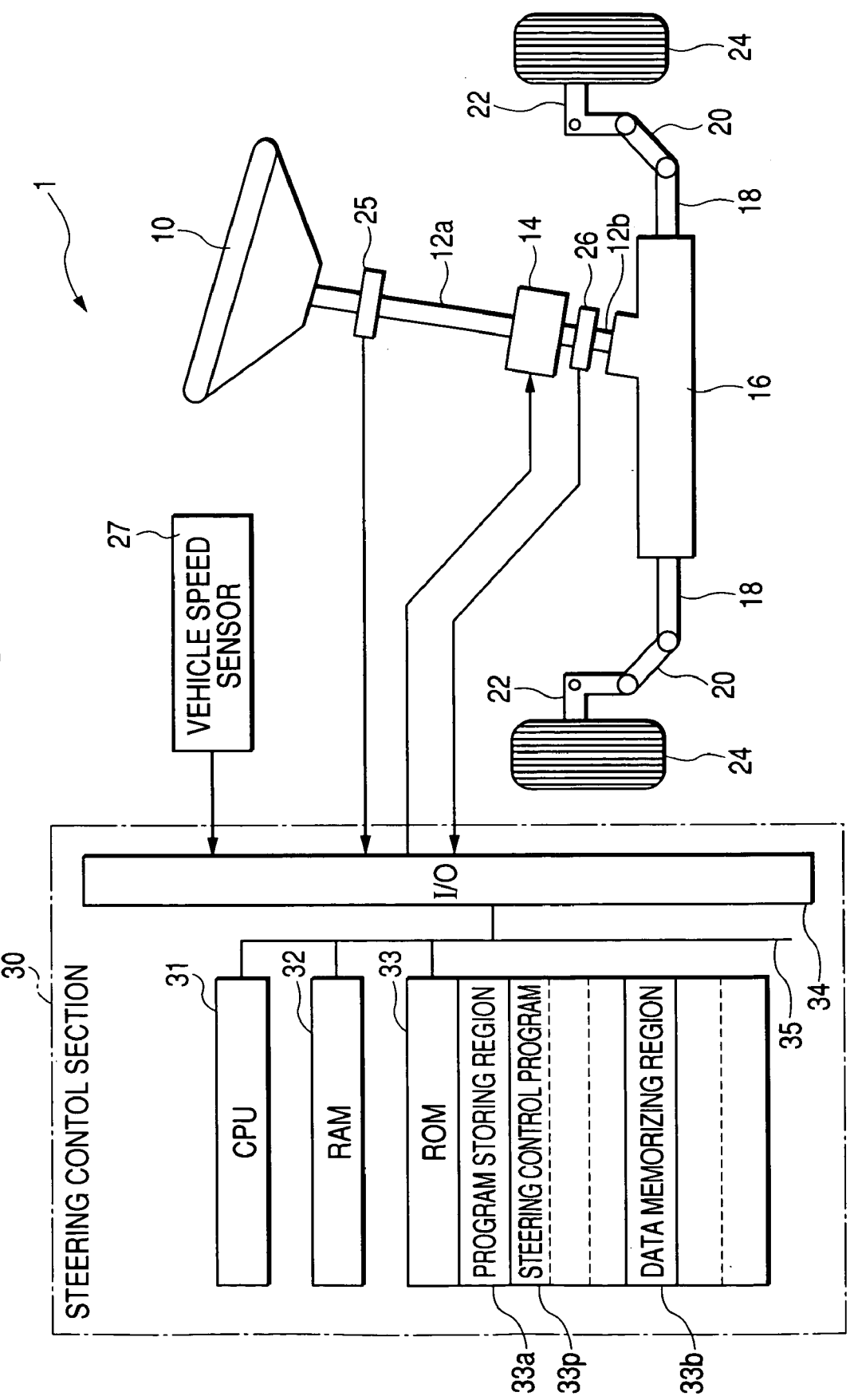
FIG. 1 is a schematic diagram showing an example of a transmission ratio adjustable steering apparatus in accordance with the present invention.

First, a transmission ratio adjustable steering apparatus will be explained in accordance with a first embodiment of the present invention. FIG. 1 shows a schematic arrangement for a transmission ratio adjustable steering apparatus 1 according to the first embodiment of the present invention. A steering wheel 10 is fixed to an upper end of a steering shaft 12a (corresponding to an input shaft of the present invention). The steering shaft 12a has a lower end connected to a transmission ratio changing mechanism 14. An upper end of a pinion shaft 12b (corresponding to an output shaft of the present invention) is connected to the transmission ratio changing mechanism 14. Furthermore, a pinion (not shown) is provided at a lower end of the pinion shaft 12b. This pinion meshes or engages with a rack bar 18 disposed in a steering wheel gearbox 16. Furthermore, each end of the rack bar 18 is linked to an inner end of a corresponding tie rod 20. The outer end of each tie rod 20 is connected to a steerable wheel 24 via knuckle arm 22. This embodiment employs a power steering device including a power assist mechanism (not shown) that is capable of assisting the rack bar 18 when it moves. For example, a hydraulic type, a motor driven type, or an electro-hydraulic type will be used.

Furthermore, a steering angle sensor 25 is attached to the steering shaft 12a to detect a steering angle of the steering wheel 10. The steering angle sensor 25 is, for example, a conventionally known rotary encoder or a comparable angle detecting device. Similarly, an output angle sensor 26 is attached to the pinion shaft 12b to detect a steered angle of the steerable wheel 24. The output angle sensor 26 is, for example, a conventionally known rotary encoder or a comparable angle detecting device. In this case, it is possible to incorporate the output angle sensor 26 into the transmission ratio changing mechanism 14. A steering control section 30 inputs a steering angle of the steering wheel 10 detected by the steering angle sensor 25 and a steered angle of the steerable wheel 24 detected by the output angle sensor 26.

Furthermore, the steering control section 30 inputs a vehicle traveling speed detected by a vehicle speed sensor 27. Moreover, the steering control section 30 can function as a solenoid drive control apparatus of the present invention that produces a control signal for controlling the transmission ratio changing mechanism 14.

Furthermore, the steering control section 30 is constituted by a well-known microcomputer including CPU 31, RAM 32, ROM 33, and an input/output interface 34 that are mutually connected via a bus line 35 and are capable of communicating with each other. Furthermore, ROM 33 includes a program storing region 33a and a data memorizing region 33b. The program storing region 33a stores a steering control program 33p. The data memorizing region 33b stores the data used in the steering control.

Figure 2:
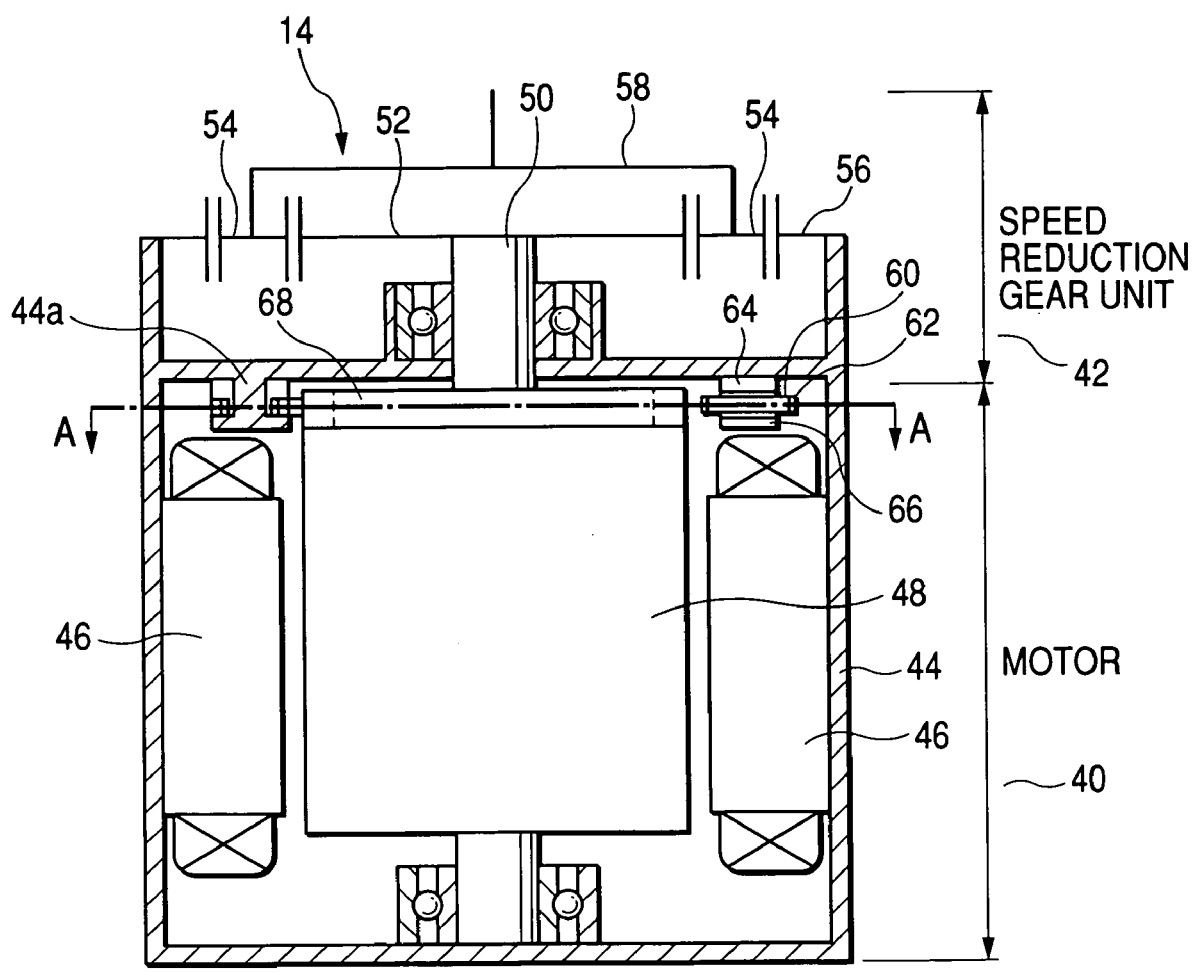
FIG. 2 is a cross-sectional view showing a transmission ratio changing mechanism of the transmission ratio adjustable steering apparatus in accordance with the present invention.

As shown in FIG. 2, the transmission ratio changing mechanism 14 includes a motor 40 and a speed reduction gear unit 42. The motor 40 includes a stator 46 and a rotor 48. The stator 46 is fixed to a motor housing 44. The speed reduction gear unit 42 is, for example, constituted by a planetary gear mechanism or a harmonic drive gear mechanism. According to the planetary gear mechanism, a rotary shaft 50 rotates together with the rotor 48 and is fixed to a sun gear 52. A predetermined number of planetary gears 54 are disposed around the sun gear 52 and angularly spaced at equal intervals. Each planetary gear 54 meshes with the sun gear 52 at the radial inner side and also meshes with a ring gear 56 formed on the inner cylindrical surface of the motor housing 44. Furthermore, each planetary gear 54 is rotatably supported by a carrier 58.

Furthermore, a locking mechanism (refer to FIGS. 3A and 3B) is provided in the motor housing 44. The locking mechanism is located at the height corresponding to an upper part of the rotor 48 (i.e. the level of a line A—A shown in FIG. 2). More specifically, the locking mechanism includes an arch-shaped locking arm 60 (corresponding to a coupling member of the present invention) disposed in the motor housing 44. The locking arm 60 corresponds in altitude to the upper part of the rotor 48. The locking arm 60 has an engaging projection 60a (corresponding to an engaging hook of the present invention) formed at the inner side of its arch-shaped body. The locking arm 60 has one end (i.e. a pivot end or a proximal end) swingably supported by the motor housing 44 by means of a pin 44a. An electromagnetic coil 62 is provided at the other end (i.e. a free end or a distal end) of the locking arm 60. Furthermore, as shown in FIG. 2, a plate magnet 64 is fixed to a ceiling of the motor housing 44. The plate magnet 64 opposes closely, from above, to the electromagnetic coil 62. On the other hand, a metallic plate 66 is fixed to the stator 46 and is positioned under the electromagnetic coil 62 in the opposed relationship. The electromagnetic coil 62, the plate magnet 64, and the metallic plate 66 cooperatively constitute a solenoid of the present invention.

Furthermore, a spring 67 (corresponding to the resilient member of the present invention) is provided in the vicinity of the free end of the locking arm 60 where the electromagnetic coil 62 is provided. One end of the spring 67 is connected to the locking arm 60 and the other end of the spring 67 is anchored to the inner cylindrical surface of the motor housing 44. The spring 67 resiliently urges or pulls the locking arm 60 toward the rotary shaft 50.

On the other hand, a rotary lock holder 68 (corresponding to a rotary member of the present invention) is provided on the upper surface of the rotor 48 of the motor 40. The lock holder 68 is fixed to the rotary shaft 50 and rotates together with the rotor 48. The lock holder 68 is provided with at least one engaging recess 68a (corresponding to an engaging recess of the present invention) that is engageable with the engaging projection 60a of the locking arm 60. According to the embodiment disclosed in FIGS. 3A and 3B, a total of four engaging recess 68a are provided.

The motor housing 44 of the motor 40 is connected to the upper end of the pinion shaft 12b. The carrier 58 is connected to the lower end of the steering shaft 12a of a universal joint (not shown).

According to the transmission ratio adjustable steering apparatus 1 of this embodiment, the steering control section 30 inputs a vehicle traveling speed detected by the vehicle speed sensor 27 and a steering angle detected by the steering angle sensor 25. The steering control section 30 calculates a target steering angle based on the entered vehicle traveling speed and the steering angle according to the steering control program 33p executed by CPU 31. The steering control section 30 outputs a control signal corresponding to the obtained target steering angle to the transmission ratio changing mechanism 14. The motor 40 of the transmission ratio changing mechanism 14 is driven based on the control signal so as to equalize the actual steered angle of the steerable wheel 24 with the target steering angle.

The above-described locking mechanism operates in the following manner.

Figure 3A:
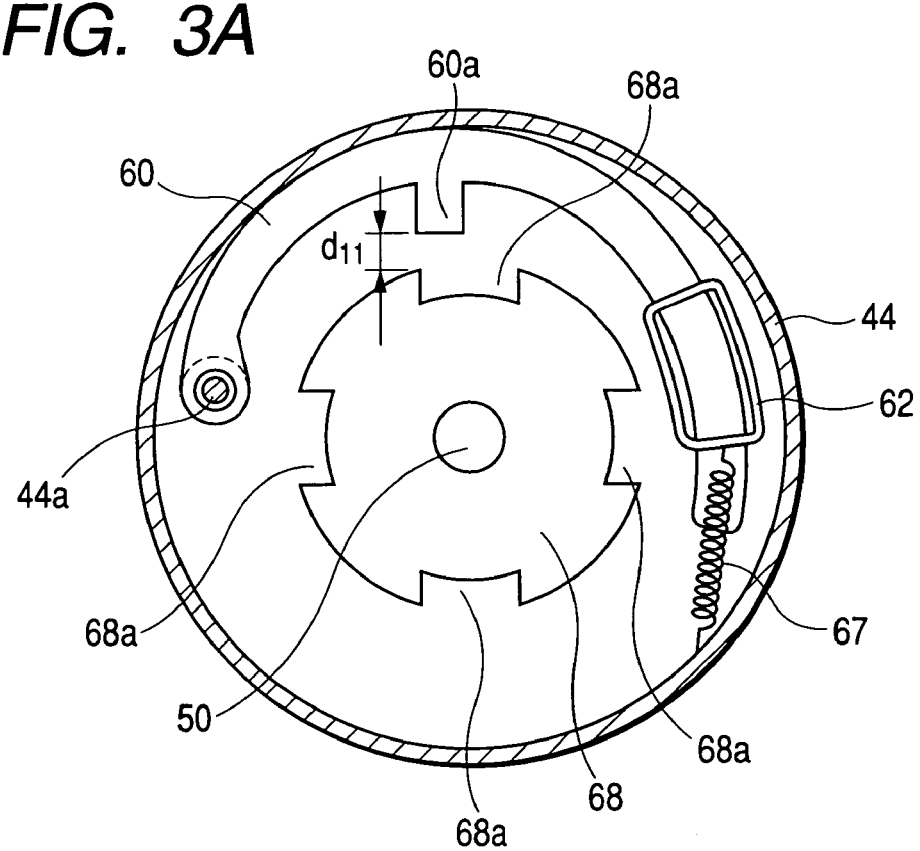
FIGS. 3A and 3B are cross-sectional views explaining the operation of a locking mechanism incorporated in the transmission ratio changing mechanism in accordance with a first embodiment of the present invention.

The steering control section 30, when the engine is operating (i.e. when the ignition switch is in ON state) and when the motor 40 is not in a failed condition, supplies electric power to the electromagnetic coil 62. The electromagnetic coil 62 generates electromagnetic force acting in the direction parallel to the metallic plate 66 that is positioned beneath the locking arm 60. The locking arm 60 is pulled toward the inner cylindrical wall of the motor housing 44 against the spring force of the spring 67. Namely, the locking arm 60 shifts in the direction departing from the lock holder 68 and accordingly the engaging projection 60a of the locking arm 60 disengages from the engaging recess 68a of the lock holder 68 as shown in FIG. 3A (corresponding to unlocked position of the present invention). When no excessive input is entered from the steerable wheel 24 and when the motor 40 is not in the failed condition, the transmission ratio changing mechanism adjusts a steered angle of the steerable wheel 24 based on the detected vehicle traveling speed.

Figure 4:
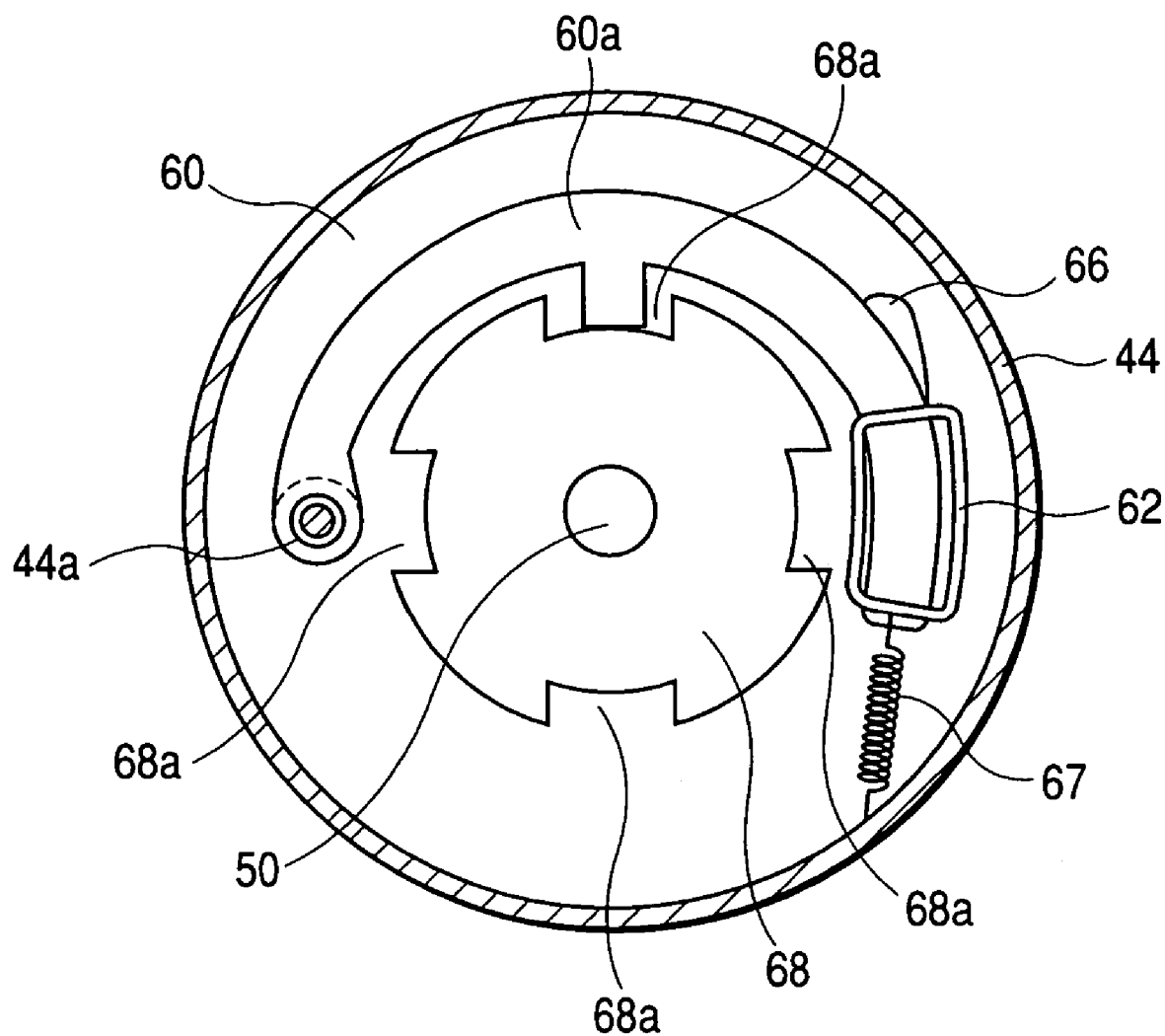
FIG. 4 is a cross-sectional view explaining the locked condition of the locking mechanism incorporated in the transmission ratio changing mechanism in accordance with the first embodiment of the present invention.

On the other hand, when the engine is stopped (i.e. when the ignition switch is in OFF state) or when the motor 40 is in the failed condition, the steering control section 30 stops electric power supply to the electromagnetic coil 62. The spring 67 resiliently forces the engaging projection 60a of the locking arm 60 to move toward the lock holder 68 and forces the engaging projection 60a to engage with the engaging recess 68a of the lock holder 68, as shown in FIG. 4 (corresponding to the locked position of the present invention).

An engagement of the engaging projection 60a and the engaging recess 68a is carried out in the following manner.

In a case that the engaging projection 60a of the locking arm 60 agrees with the engaging recess 68a of the lock holder 68 in their angular positions in the circumferential direction, the engaging projection 60a directly and immediately engages with the engaging recess 68a. When the engaging projection 60a of the locking arm 60 disagrees with the engaging recess 68a of the lock holder 68, the locking operation cannot be accomplished immediately and accordingly the lock holder 68 can rotate relative to the locking arm 60 for a while until the engaging projection 60a agrees with the engaging recess 68a in their angular positions. Thus, the engaging projection 60a immediately engages with the engaging recess 68a upon the engaging projection 60a agreeing with the engaging recess 68a in their angular positions. Accordingly, even when the motor 40 is failed in operation, the transmission ratio can be fixed to a predetermined value and accordingly the driver can safely steer the wheels 24.

Furthermore, this embodiment uses the PWM (=Pulse Width Modulation) control to adjust a drive voltage applied to the electromagnetic coil 62. The steering control section 30 determines the drive voltage applied to the electromagnetic coil 62 according to the steering control program 33p, and produces a PWM signal based on a duty ratio corresponding to the applied voltage.

Figure 3B:
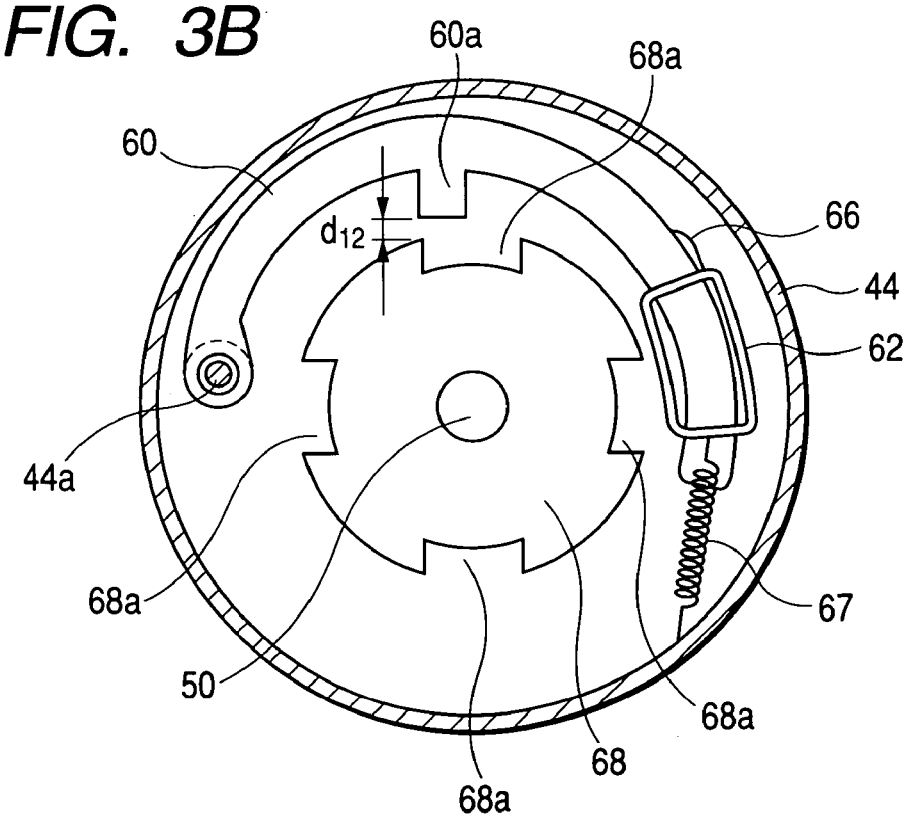
Figure 5B:
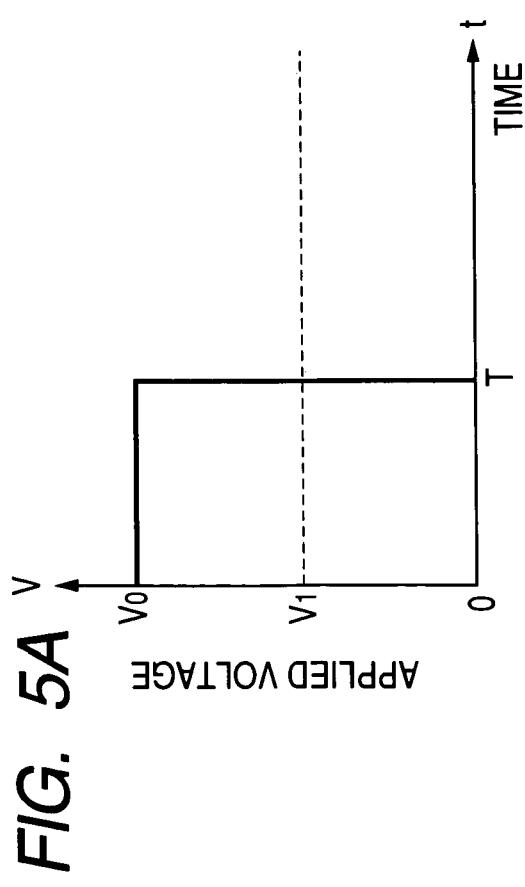
Figure 6:
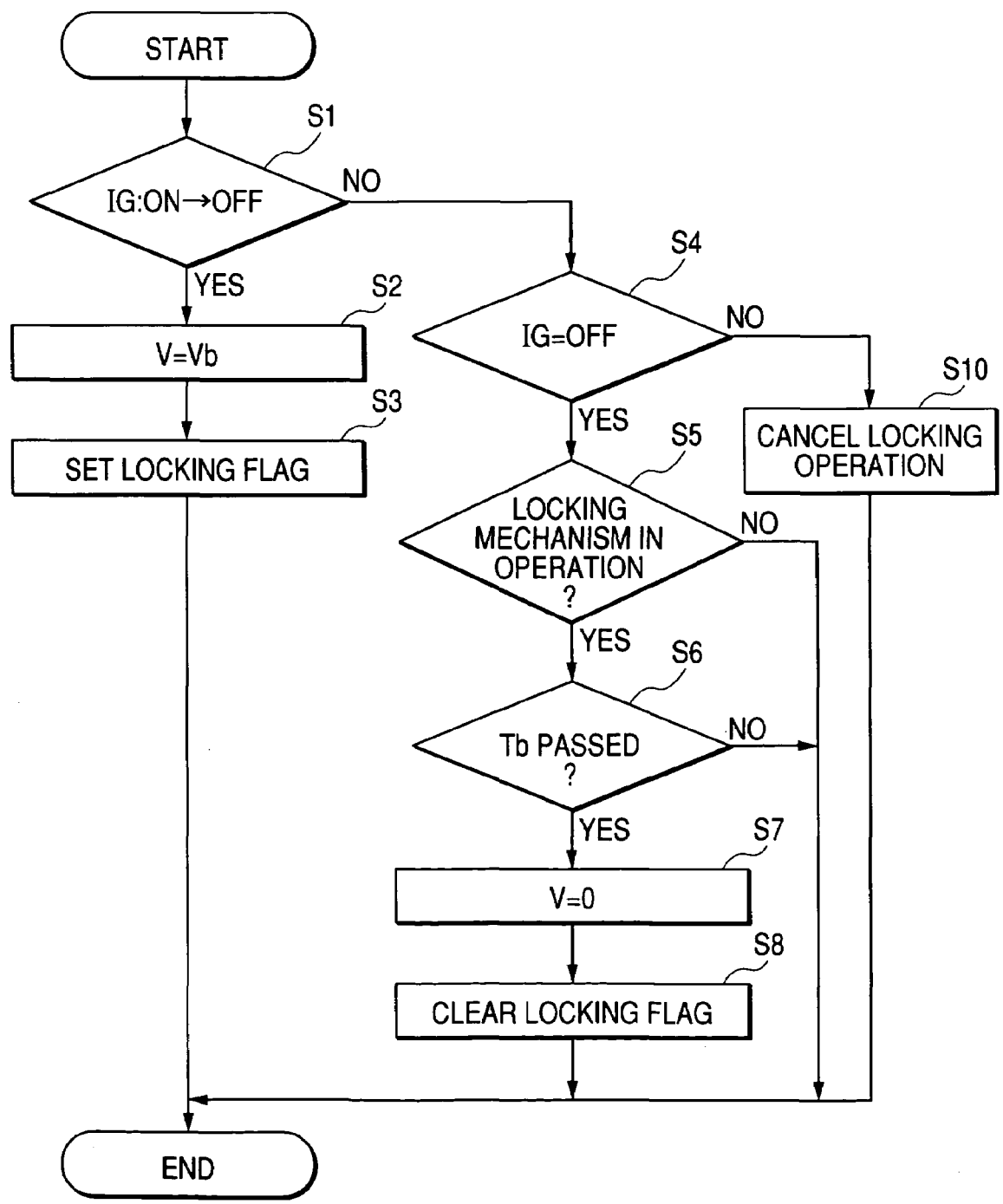
FIG. 6 is a flowchart showing a first method for applying the drive voltage to the electromagnetic coil or to the solenoid in accordance with the present invention.

The steering control section 30 (more specifically, CPU31) executes the operational processing for the locking mechanism with the steering control program 33p. Hereinafter, a first example of the steering control program 33p according to the first embodiment of the present invention will be explained with reference to the flowchart of FIG. 6 together with FIGS. 3A, 3B, and 4 and the graph of FIG. 5B. First, it is checked whether or not the ignition switch (not shown in the drawing) is changed from the ON state to the OFF state (refer to step S1). When the condition of the ignition switch is changed to the OFF state (i.e. YES in step S1), the steering control section 30 changes the PWM duty ratio so that the voltage applied to the electromagnetic coil 62 decreases stepwise from V0 to Vb as shown in FIG. 5B (refer to step S2). Then, the steering control section 30 sets a locking flag indicating that the locking mechanism is in operation (refer to step S3). In this condition, the electromagnetic force of the electromagnetic coil 62 decreases by an amount corresponding to the reduction in the applied voltage. In other words, the spring force of the spring 67 becomes larger than the electromagnetic force of the electromagnetic coil 62 and accordingly the engaging projection 60a of the locking arm 60 shifts toward the lock holder 68 and is held at a predetermined balancing point. More specifically, when the voltage V0 is applied to the electromagnetic coil 62, there is a gap of distance $d_{11}$ between the engaging projection 60a and the outer peripheral portion of the lock holder 68 as shown in FIG. 3A (corresponding to the unlocked position of the present invention). On the other hand, when the voltage applied to the electromagnetic coil 62 is reduced to Vb, the gap between the engaging projection 60a and the outer peripheral portion of the lock holder 68 decreases to distance $d_{12}$ as shown in FIG. 3B (corresponding to the near side position of the present invention). At this moment, the engaging projection 60a is not yet brought into contact with the outer peripheral portion of the lock holder 68 and accordingly the lock holder 68 can rotate continuously.

When the ignition switch is not changed from the ON state to the OFF state (i.e. NO in step S1), it is checked whether or not the ignition switch is in the OFF state (refer to step S4). When the ignition switch is in the ON state (i.e. NO in step S4), the locking operation is cancelled (refer to step S10). The steering control section 30 releases the locking arm 60 as shown in FIG. 3A, and executes the processing for the transmission ratio adjustable steering apparatus 1 being in an ordinary condition. When the ignition switch is in the OFF state (i.e. YES in step S4), it is checked whether or not the locking mechanism is in operation (refer to step S5). When the locking mechanism is not in operation (i.e. NO in step S5), the steering control section 30 terminates this processing immediately.

When the ignition switch is in the OFF state and the locking mechanism is in operation (i.e. YES in step S5), it is checked whether or not a predetermined time Tb (e.g. 5 sec) has passed since the ignition switch has turned from the ON state to the OFF state (refer to step S6). When the predetermined time Tb has not yet passed (i.e. NO in step S6), the steering control section 30 terminates this processing immediately. When the predetermined time Tb has already passed (i.e. YES in step S6), the steering control section 30 reduces the voltage V applied to the electromagnetic coil 62 to 0V (refer to step S7). Then, the steering control section 30 clears the locking flag that indicates the locking mechanism being in operation (refer to step S8). In this case, the electromagnetic coil 62 generates no electromagnetic force. Thus, the contraction force of the spring 67 causes the engaging projection 60a to shift from the condition of FIG. 3B to the condition of FIG. 4. The engaging projection 60a completely engages with the engaging recess 68a. In other words, the locking arm 60 is locked with the lock holder 68.

Tb is a sufficiently long time compared with a time required for the locking arm 60 to accomplish a shifting movement from the condition shown in FIG. 3A to the condition shown in FIG. 3B. In the condition of FIG. 3A, there is a gap of distance $d_{11}$ between the engaging projection 60a and an outer peripheral portion of the lock holder 68. In the condition of FIG. 3B, the gap between the engaging projection 60a and the outer peripheral portion of the lock holder 68 reduces to a distance of $d_{12}$. Furthermore, Tb should be determined considering a time constant determined by an inductance of the electromagnetic coil 62 and a resistance component contained in the electromagnetic coil 62 (i.e. a delay time of the voltage applied to the electromagnetic coil 62 that changes from V0 to Vb).

Figure 7:
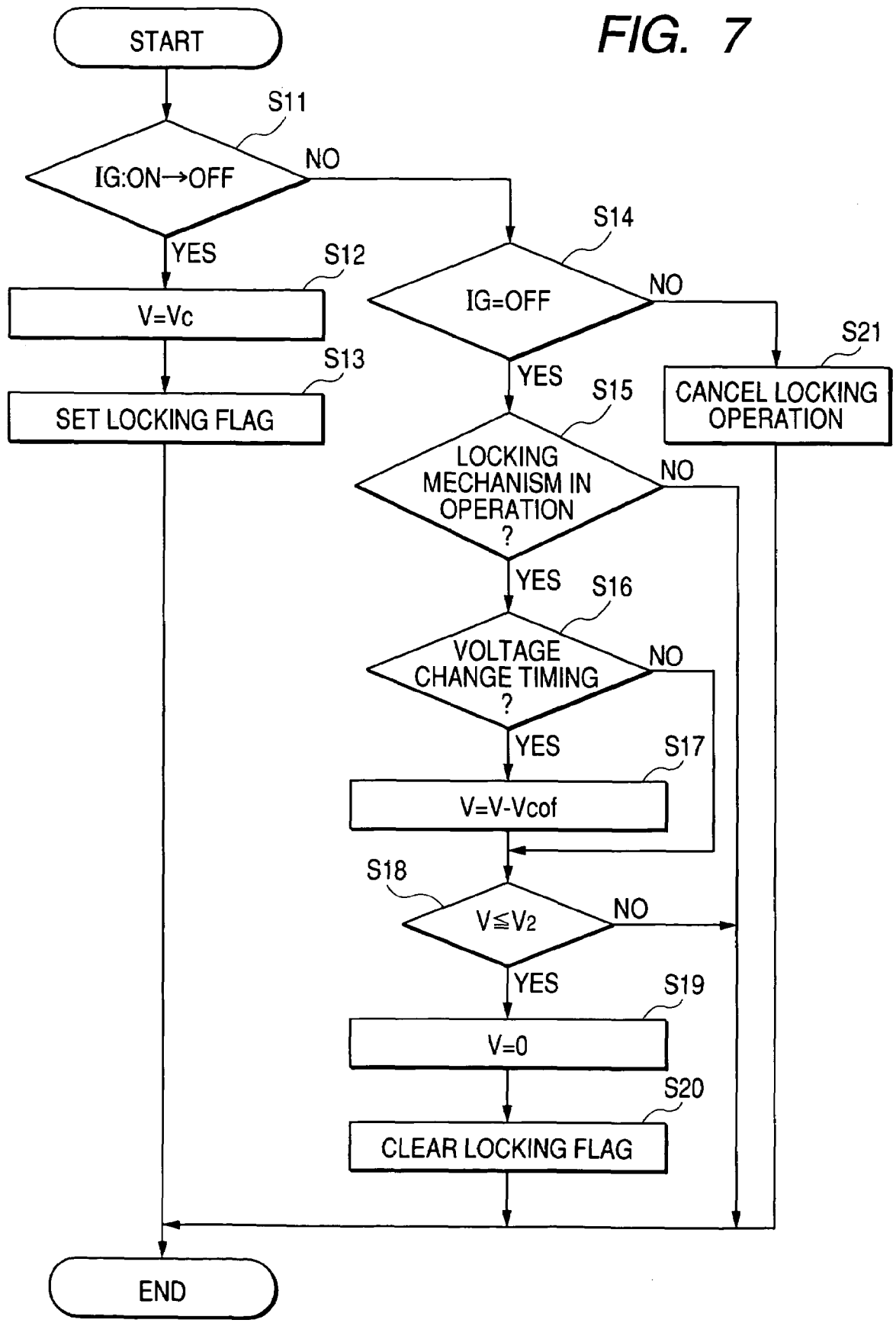
FIG. 7 is a flowchart showing a second method for applying the drive voltage to the electromagnetic coil or to the solenoid in accordance with the present invention.

Hereinafter, a second example of the steering control program 33p according to the first embodiment of the present invention will be explained with reference to the flowchart of FIG. 7 together with FIGS. 3A, 3B, and 4 and the graph of FIG. 5C. The steering control section 30 (more specifically, CPU31) executes the operational processing for the locking mechanism with this steering control program 33p. First, it is checked whether or not the ignition switch (not shown in the drawing) is changed from the ON state to the OFF state (refer to step S11). When the condition of the ignition switch is changed to the OFF state (i.e. YES in step S11), the steering control section 30 changes the PWM duty ratio so that the voltage applied to the electromagnetic coil 62 decreases stepwise from V0 to Vc as shown in FIG. 5C (refer to step S12). Then, the steering control section 30 sets a locking flag indicating that the locking mechanism is in operation (refer to step S13). In this condition, the electromagnetic force of the electromagnetic coil 62 decreases by an amount corresponding to a reduction in the applied voltage. In other words, the spring force of the spring 67 becomes larger than the electromagnetic force of the electromagnetic coil 62 and accordingly the engaging projection 60a of the locking arm 60 shifts toward the lock holder 68. More specifically, when the voltage V0 is applied to the electromagnetic coil 62, there is a gap of distance $d_{11}$ between the engaging projection 60a and an outer peripheral portion of the lock holder 68 as shown in FIG. 3A (corresponding to the unlocked position of the present invention). On the other hand, when the voltage applied to the electromagnetic coil 62 is reduced to Vc, the gap between the engaging projection 60a and the outer peripheral portion of the lock holder 68 decreases to distance $d_{12}$ as shown in FIG. 3B (corresponding to the near side position of the present invention). At this moment, the engaging projection 60a is not yet brought into contact with the outer peripheral portion of the lock holder 68 and accordingly the lock holder 68 can rotate continuously.

When the ignition switch is not changed from the ON state to the OFF state (i.e. NO in step S11), it is checked whether or not the ignition switch is in the OFF state (refer to step S14). When the ignition switch is in the ON state (i.e. NO in step S14), the locking operation is cancelled (refer to step S21). The steering control section 30 releases the locking arm 60 as shown in FIG. 3A, and executes the processing for the transmission ratio adjustable steering apparatus 1 being in an ordinary condition. When the ignition switch is in the OFF state (i.e. YES in step S14), it is then checked whether or not the locking mechanism is in operation (refer to step S15). When the locking mechanism is not in operation (i.e. NO in step S15), the steering control section 30 terminates this processing immediately.

When the ignition switch is in the OFF state and the locking mechanism is in operation (i.e. YES in step S15), the steering control section 30 then checks in step S16 whether or not it is the time to change the voltage V (i.e. PWM duty ratio) applied to the electromagnetic coil 62. When it is the time to change the voltage (i.e. YES in step S16), the steering control section 30 changes the PWM duty ratio so that the voltage applied to the electromagnetic coil 62 is reduced by an amount of Vcof (e.g. 0.1V) (refer to step S17). The electromagnetic force of the electromagnetic coil 62 decreases by an amount corresponding to a reduction in the applied voltage. In other words, the spring force of the spring 67 becomes larger than the electromagnetic force of the electromagnetic coil 62 and accordingly the engaging projection 60a of the locking arm 60 shifts toward the lock holder 68 and is held at a new balancing point (closer to the lock holder 68). When the voltage change timing has not come yet (i.e. NO in step S16), the steering control section 30 skips the step S17 and proceeds to the next step S18.

According to the voltage characteristics shown in FIG. 5C, the contraction force of the spring 67 exceeds the electromagnetic force of the electromagnetic coil 62 when the voltage V applied to the electromagnetic coil 62 approaches to V1. The spring 67 and the electromagnetic coil 62 cannot maintain a balanced condition. Accordingly, the engaging projection 60a engages with the engaging recess 68a (refer to FIG. 4).

After the PWM duty ratio is changed, it is checked whether or not the voltage V applied to the electromagnetic coil 62 has reduced to V2 (refer to step S18). When the voltage V applied to the electromagnetic coil 62 is larger than V2 (NO in step S18), the steering control section 30 terminates this processing. When the voltage V applied to the electromagnetic coil 62 is equal to or smaller than V2 (YES in step S18), the steering control section 30 reduces the voltage V applied to the electromagnetic coil 62 to 0V (refer to step S19). Then, the steering control section 30 clears the locking flag that indicates the locking mechanism being in operation (refer to step S20).

In this case, voltage V1 is an averaged voltage necessary for the electromagnetic coil 62 to maintain the engaged condition of the engaging projection 60a and the engaging recess 68a. Furthermore, voltage V2 is a minimum (or lowest) voltage necessary for the electromagnetic coil 62 to maintain the above engaged condition when various differences of constituent components need to be taken into consideration.

Figure 8:
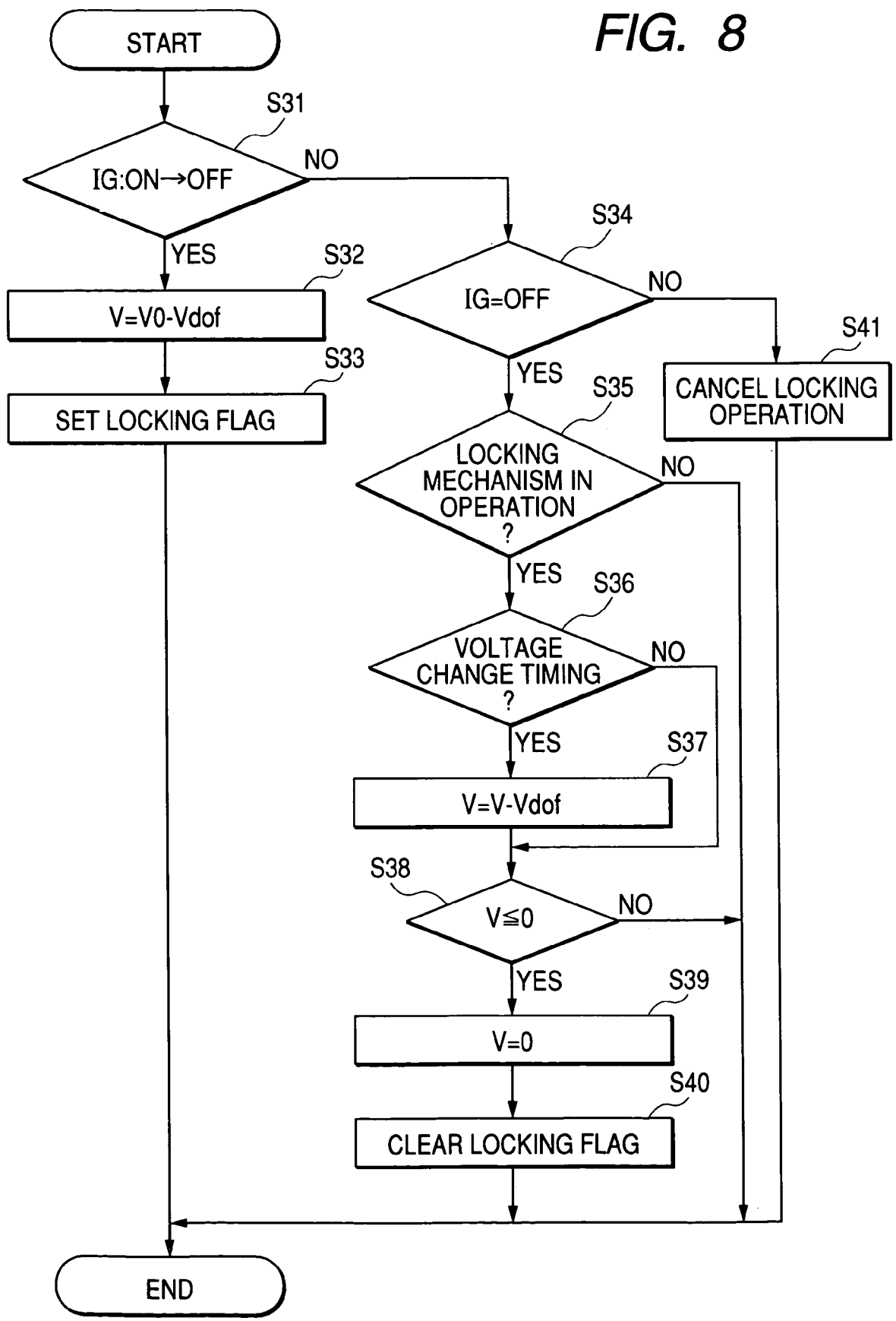
FIG. 8 is a flowchart showing a third method for applying the drive voltage to the electromagnetic coil or to the solenoid in accordance with the present invention.

Hereinafter, a third example of the steering control program 33p according to the first embodiment of the present invention will be explained with reference to the flowchart of FIG. 8 together with FIGS. 3A, 3B, and 4 and the graph of FIG. 5D. The steering control section 30 (more specifically, CPU31) executes the operational processing for the locking mechanism with this steering control program 33p. First, it is checked whether or not the ignition switch (not shown in the drawing) is changed from the ON state to the OFF state (refer to step S31). When the condition of the ignition switch is changed to the OFF state (i.e. YES in step S31), the steering control section 30 changes the PWM duty ratio so that the voltage applied to the electromagnetic coil 62 decreases linearly at a constant rate from V0 to 0 as shown in FIG. 5D (refer to step S32). More specifically, in response to turning-off action of the ignition switch, the steering control section 30 changes the PWM duty ratio to decrease the voltage applied to the electromagnetic coil 62 by an amount of Vdof. Then, the steering control section 30 sets a locking flag indicating that the locking mechanism is in operation (refer to step S33).

When the ignition switch is not changed from the ON state to the OFF state (i.e. NO in step S31), it is checked whether or not the ignition switch is in the OFF state (refer to step S34). When the ignition switch is in the ON state (i.e. NO in step S34), the locking operation is cancelled (refer to step S41). The steering control section 30 releases the locking arm 60 as shown in FIG. 3A, and executes the processing for the transmission ratio adjustable steering apparatus 1 being in an ordinary condition. When the ignition switch is in the OFF state (i.e. YES in step S34), it is checked whether or not the locking mechanism is in operation (refer to step S35). When the locking mechanism is not in operation (i.e. NO in step S55), the steering control section 30 terminates this processing immediately.

When the ignition switch is in the OFF state and the locking mechanism is in operation (i.e. YES in step S35), the steering control section 30 checks whether or not it is the time to change the voltage V (i.e. PWM duty ratio) applied to the electromagnetic coil 62. When it is the time to change the voltage (i.e. YES in step S36), the steering control section 30 changes the PWM duty ratio so that the voltage applied to the electromagnetic coil 62 decreases by an amount of Vdof (refer to step S37). When the voltage change timing has not come yet (i.e. NO in step S36), the steering control section 30 skips the step S37 and proceeds to the next step S38. Accordingly, an electromagnetic force of the electromagnetic coil 62 decreases by an amount corresponding to a reduction in the applied voltage. In other words, the spring force of the spring 67 becomes larger than the electromagnetic force of the electromagnetic coil 62 and accordingly the engaging projection 60a of the locking arm 60 shifts toward the lock holder 68 and is held, as a result, at a balancing point (closer to the lock holder 68).

According to the voltage characteristics shown in FIG. 5D, the contraction force of the spring 67 exceeds the electromagnetic force of the electromagnetic coil 62 when the voltage V applied to the electromagnetic coil 62 approaches to V1. The spring 67 and the electromagnetic coil 62 cannot maintain a balanced condition. Accordingly, the engaging projection 60a engages with the engaging recess 68a (refer to FIG. 4).

After the PWM duty ratio is changed, it is checked whether or not the voltage V applied to the electromagnetic coil 62 has reduced to 0 (refer to step S38). When the voltage V applied to the electromagnetic coil 62 is larger than 0 (NO in step S38), the steering control section 30 terminates this processing. When the voltage V applied to the electromagnetic coil 62 is equal to or smaller than 0 (YES in step S38), it is regarded that voltage V applied to the electromagnetic coil 62 is 0V (refer to step S39). Then, the steering control section 30 clears the locking flag that indicates the locking mechanism being in operation (refer to step S40).

In this third example, Vdof represents a decreasing rate (V0/Td) of the voltage V applied to the electromagnetic coil 62. Although the Vdof is set to be constant in this example, it is possible to change Vdof at the final stage of the shifting movement of the engaging projection 60a approaching to the lock holder 68 (e.g. when the voltage V decreases below the voltage value V1).

Figure 11A:
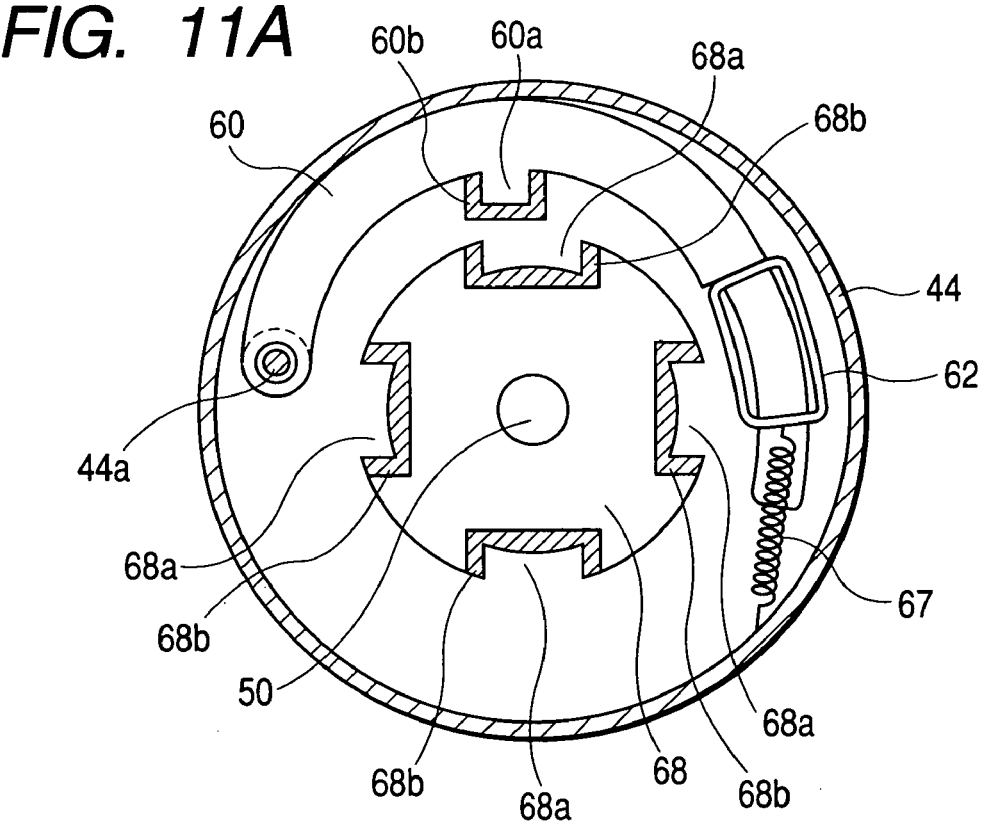
FIGS. 11A and 11B are cross-sectional views explaining the operation of a modified locking mechanism incorporated in the transmission ratio changing mechanism in accordance with the second embodiment of the present invention.

Besides the above-described arrangement, as shown in FIG. 11A, it is possible to attach a rubber or resilient member 60b to the engaging projection 60a or attach a rubber or resilient member 68b to the engaging recess 68a. In other words, it is desirable to provide a rubber or comparable resilient member to suppress the noise sounds generating when the engaging projection 60a engages with the engaging recess 68a. For example, this arrangement allows the steering control section 30 to use the voltage characteristics shown in FIG. 5A, instead of employing the operational processing for the locking mechanism described above. According to FIG. 5A, when the ignition switch changes from the ON state to the OFF state, the voltage V applied to the electromagnetic coil 62 immediately drops to 0V. Even if the voltage V decreases abruptly, the resilient member attached to the engaging projection 60a and/or to the engaging recess 68a can effectively reduce the noise sounds generating when the locking arm 60 engages with the lock holder 68.

Figure 11B:
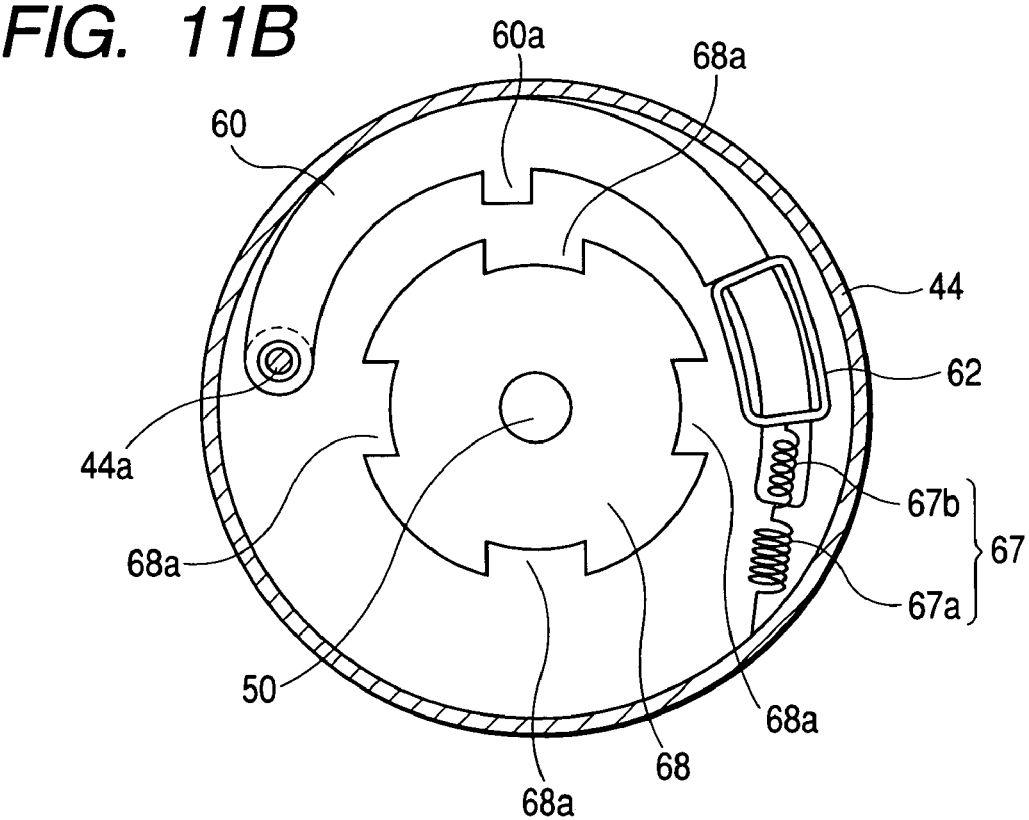

Furthermore, as shown in FIG. 11B, it is possible to constitute the spring 67 by a combination of two springs 67a and 67b which are connected in series and different in their elastic modulus. Using the combination of two springs 67a and 67b makes it possible to further reduce the noise sounds generating when the engaging projection 60a engages with the engaging recess 68a. According to this arrangement, one spring 67a with a larger elastic modulus contracts first and then the other spring 67b with a smaller elastic modulus contracts next. In other words, the shifting speed of the locking arm 60 becomes small at the final stage of the contracting process of the composite spring 67. This is effective in absorbing the shock (and accordingly in suppressing noise sounds) occurring in the engagement of the engaging projection 60a with the engaging recess 68a. For example, this arrangement allows the steering control section 30 to use the voltage characteristics shown in FIG. 5A, instead of employing the operational processing for the locking mechanism described above. As described above, according to FIG. 5A, the voltage V applied to the electromagnetic coil 62 immediately drops to 0V in response to turning-off action of the ignition switch. Even if the voltage V decreases abruptly, the composite spring 67 consisting of two springs 67a and 67b that are connected in series and different in their elastic modulus can effectively reduce noise sounds generating when the locking arm 60 engages with the lock holder 68.

Furthermore, it is possible to employ both of the above-proposed arrangements shown in FIGS. 11A and 11B. In this case, a rubber or resilient member is attached to at least one of the engaging projection 60a of the locking arm 60 and the engaging recess 68a or the lock holder 68. The spring 67 is constituted by a combination of two springs 67a and 67b which are connected in series and different in their elastic modulus. This is effective in further reducing the noise sounds generating when the engaging projection 60a engages with the engaging recess 68a.

Figure 5A:
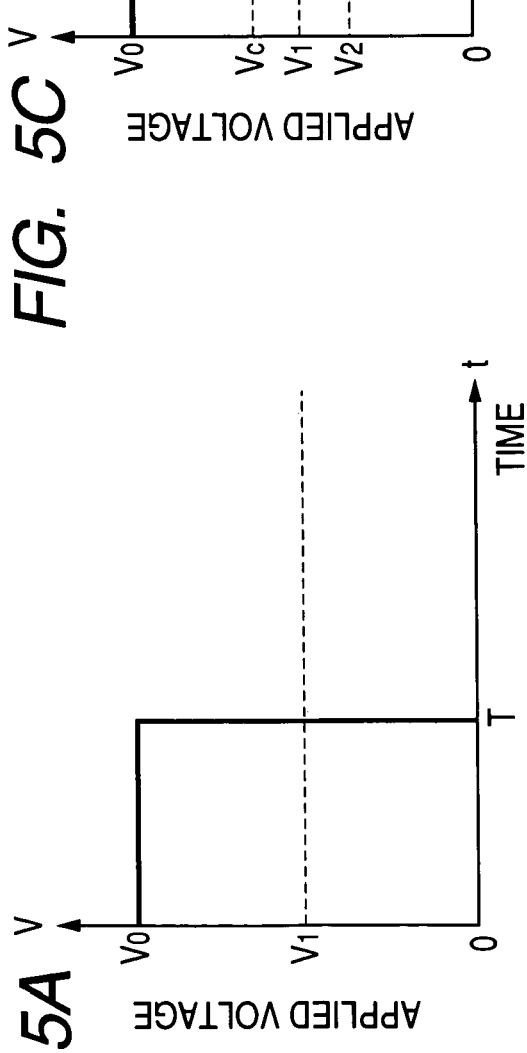
FIGS. 5A to 5D are graphs explaining the change of a drive voltage applied to an electromagnetic coil or to a solenoid in accordance with the present invention.
Figure 5C:
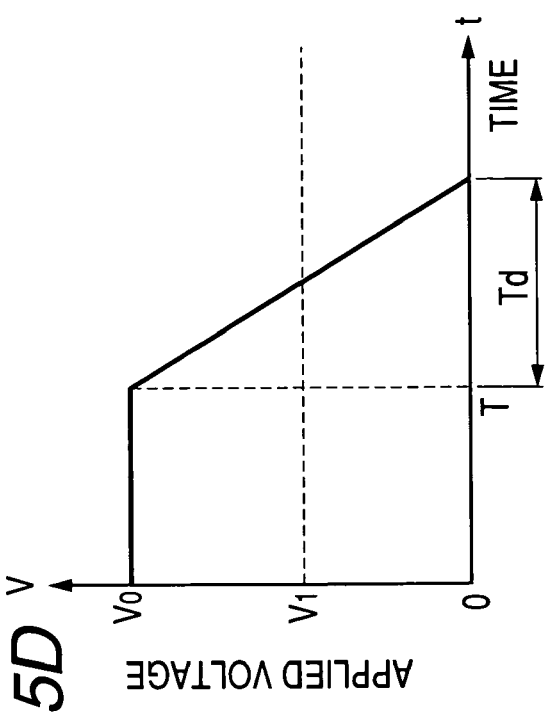
Figure 5D:
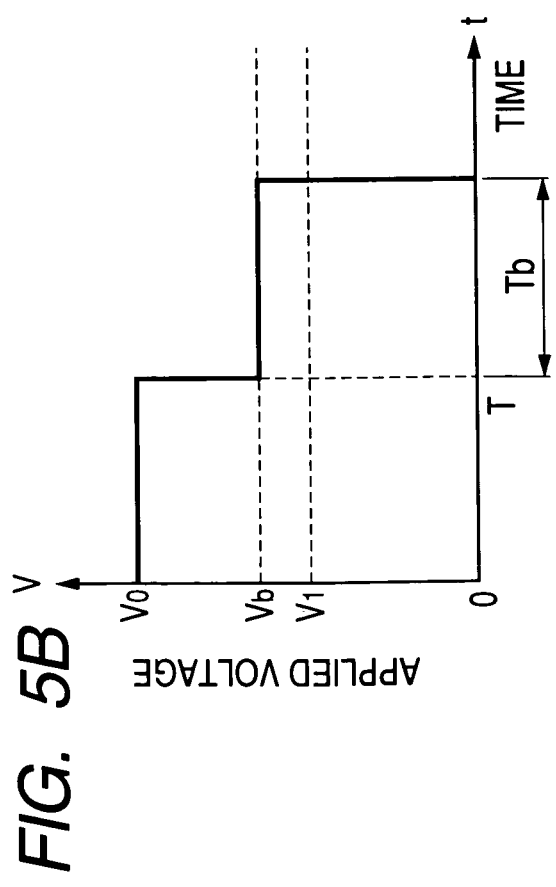

For example, this arrangement allows the steering control section 30 to use the voltage characteristics shown in FIG. 5A, instead of employing the operational processing for the locking mechanism described above. As described above, according to FIG. 5A, the voltage V applied to the electromagnetic coil 62 immediately drops to 0V in response to turning-off action of the ignition switch. Even if the voltage V decreases abruptly, the resilient member attached to the engaging projection 60a and/or to the engaging recess 68a and the composite spring 67 consisting of two springs 67a and 67b that are connected in series and different in their elastic modulus can effectively reduce noise sounds generating when the locking arm 60 engages with the lock holder 68.

Second Embodiment

Next, with reference to FIGS. 9A and 9B and 10, a transmission ratio adjustable steering apparatus will be explained with a second embodiment of the present invention. The transmission ratio adjustable steering apparatus according to the second embodiment is different from the first embodiment shown in FIG. 1 in that the locking mechanism (refer to FIG. 2 or FIGS. 3A and 3B) of the transmission ratio adjustable steering apparatus 1 is replaced with an arrangement shown in FIGS. 9A and 9B. Accordingly, except for the locking mechanism, the transmission ratio adjustable steering apparatus according to the second embodiment is structurally identical with the transmission ratio adjustable steering apparatus of the first embodiment. Thus, the same reference numerals are attached to the components identical with those of the transmission ratio adjustable steering apparatus 1 of the first embodiment already explained with reference to FIGS. 1 to 8.

Figure 9A:
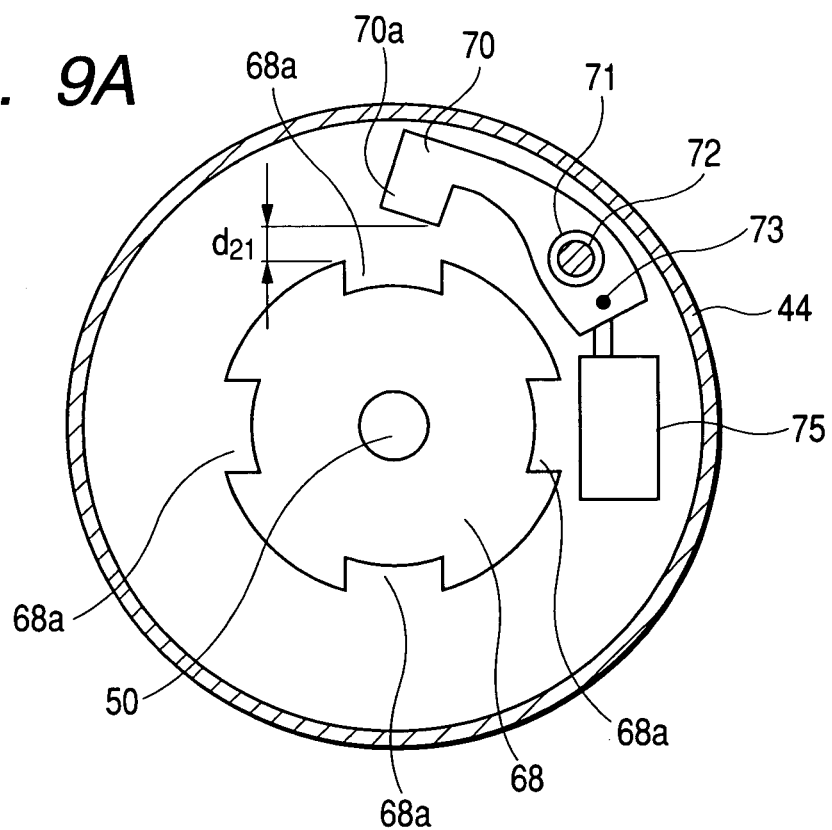
FIGS. 9A and 9B are cross-sectional views explaining the operation of another locking mechanism incorporated in the transmission ratio changing mechanism in accordance with a second embodiment of the present invention.
Figure 9B:
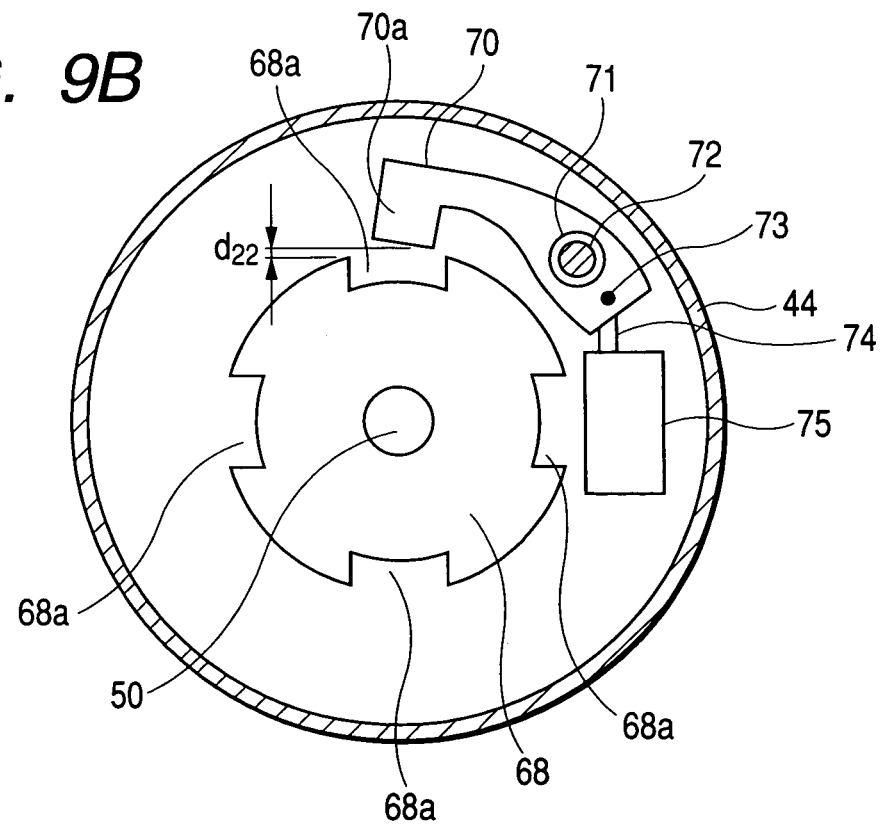
Figure 10:
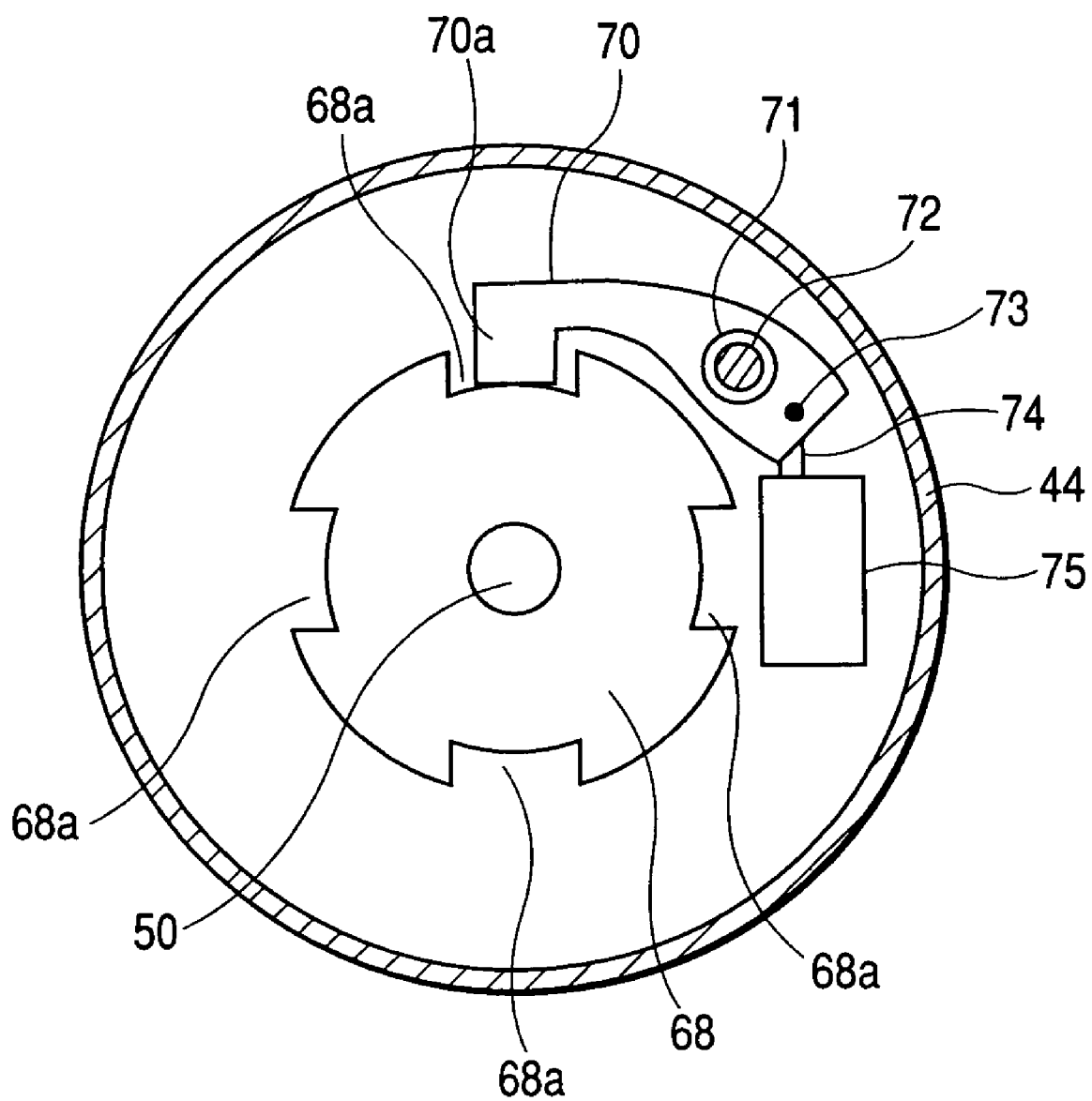
FIG. 10 is a cross-sectional view explaining the locked condition of the locking mechanism incorporated in the transmission ratio changing mechanism in accordance with the second embodiment of the present invention.

In FIGS. 9A and 9B, a locking pin 70 (corresponding to a coupling member of the present invention) is rotatably attached to a rotary base 72. The rotary base 72 is fixed to the motor housing. A rear end portion 73 is connected to a solenoid 75 (corresponding to a solenoid of the present invention). Furthermore, a coil spring 71 (corresponding to a resilient member of the present invention) is provided around the rotary base 72 to resiliently return the locking pin 70 to its original position when the solenoid 75 is deactivated. According to this arrangement, the solenoid 75 generates an electromagnetic force in accordance with an applied voltage. An electromagnetic force produced from the solenoid 75 causes the locking pin 70 to rotate about the rotary base 72 against a resilient force of the coil spring 71. The engaging projection 70a (corresponding to an engaging hook of the present invention) of the locking pin 70 separates or disengages from the engaging recess 68a (corresponding to an engaging recess of the present invention) of the lock holder 68. This arrangement enables the locking pin 70 to rotate about the rotary base 72 so that the engaging projection 70a selectively engages with or disengages from the engaging recess 68a. The solenoid 75 is duty driven by the PWM control.

The steering control section 30 (more specifically, CPU31) executes the operational processing for the locking mechanism with the steering control program 33p. Hereinafter, a first example of the steering control program 33p according to the second embodiment of the present invention will be explained with reference to the flowchart of FIG. 6 together with FIGS. 9A, 9B, and 10 and the graph of FIG. 5B. First, it is checked whether or not the ignition switch (not shown in the drawing) is changed from the ON state to the OFF state (refer to step S1). When the condition of the ignition switch is changed to the OFF state (i.e. YES in step S1), the steering control section 30 changes the PWM duty ratio so that the voltage V applied to the solenoid 75 decreases stepwise from V0 to Vb as shown in FIG. 5B (refer to step S2). Then, the steering control section 30 sets a locking flag indicating that the locking mechanism is in operation (refer to step S3). In this condition, a pulling force of the solenoid 75 decreases by an amount corresponding to the reduction in the applied voltage. In other words, the spring force of the coil spring 71 becomes larger than the pulling force of the solenoid 75 and accordingly the engaging projection 70a of the locking pin 70 shifts toward the lock holder 68 and is held at a predetermined balancing point. More specifically, when the voltage V0 is applied to the solenoid 75, there is a gap of distance $d_{21}$ between the engaging projection 70a and an outer peripheral portion of the lock holder 68 as shown in FIG. 9A (corresponding to the unlocked position of the present invention). On the other hand, when the voltage applied to the solenoid 75 is reduced to Vb, the gap between the engaging projection 70a and the outer peripheral portion of the lock holder 68 decreases to distance $d_{22}$ as shown in FIG. 9B (corresponding to the near side position of the present invention). At this moment, the engaging projection 70a is not yet brought into contact with the outer peripheral portion of the lock holder 68 and accordingly the lock holder 68 can rotate continuously.

When the ignition switch is not changed from the ON state to the OFF state (i.e. NO in step S1), it is checked whether or not the ignition switch is in the OFF state (refer to step S4). When the ignition switch is in the ON state (i.e. NO in step S4), the locking operation is cancelled (refer to step S10). The steering control section 30 releases the locking pin 70 as shown in FIG. 9A, and executes the processing for the transmission ratio adjustable steering apparatus 1 being in an ordinary condition. When the ignition switch is in the OFF state (i.e. YES in step S4), it is checked whether or not the locking mechanism is in operation (refer to step S5). When the locking mechanism is not in operation (i.e. NO in step S5), the steering control section 30 terminates this processing immediately.

When the ignition switch is in the OFF state and the locking mechanism is in operation (i.e. YES in step S5), it is checked whether or not a predetermined time Tb (e.g. 5 sec) has passed since the ignition switch has turned from the ON state to the OFF state (refer to step S6). When the predetermined time Tb has not yet passed (i.e. NO in step S6), the steering control section 30 terminates this processing immediately. When the predetermined time Tb has already passed (i.e. YES in step S6), the steering control section 30 reduces the voltage V applied to the solenoid 75 to 0V (refer to step S7). Then, the steering control section 30 clears the locking flag that indicates the locking mechanism being in operation (refer to step S8). In this case, the solenoid 75 generates no pulling force. Thus, a rotational force of the coil spring 71 causes the engaging projection 70a to shift from the condition of FIG. 9B to the condition of FIG. 10. The engaging projection 70a completely engages with the engaging recess 68a. In other words, the locking pin 70 is locked with the lock holder 68.

Tb is a sufficiently long time compared with a time required for the locking pin 70 to accomplish a shifting movement from the condition shown in FIG. 9A to the condition shown in FIG. 9B. In the condition of FIG. 9A, there is a gap of distance $d_{21}$ between the engaging projection 70a and an outer peripheral portion of the lock holder 68. In the condition of FIG. 9B, the gap between the engaging projection 70a and the outer peripheral portion of the lock holder 68 reduces to a distance of $d_{22}$. Furthermore, Tb should be determined considering a time constant determined by an inductance of the solenoid 75 and a resistance component contained in the solenoid 75 (i.e. a delay time of the drive voltage applied to the solenoid 75 that changes from V0 to Vb).

Hereinafter, a second example of the steering control program 33p according to the second embodiment of the present invention will be explained with reference to the flowchart of FIG. 7 together with FIGS. 9A, 9B, and 10 and the graph of FIG. 5C. The steering control section 30 (more specifically, CPU31) executes the operational processing for the locking mechanism with this steering control program 33p. First, it is checked whether or not the ignition switch (not shown in the drawing) is changed from the ON state to the OFF state (refer to step S11). When the condition of the ignition switch is changed to the OFF state (i.e. YES in step S11), the steering control section 30 changes the PWM duty ratio so that the voltage V applied to the solenoid 75 decreases stepwise from V0 to Vc as shown in FIG. 5C (refer to step S12). Then, the steering control section 30 sets a locking flag indicating that the locking mechanism is in operation (refer to step S13). In this condition, the pulling force of the solenoid 75 decreases by an amount corresponding to a reduction in the applied voltage. In other words, a spring force of the coil spring 71 becomes larger than the pulling force of the solenoid 75 and accordingly the engaging projection 70a of the locking pin 70 shifts toward the lock holder 68. More specifically, when the voltage V0 is applied to the solenoid 75, there is a gap of distance $d_{21}$ between the engaging projection 70a and an outer peripheral portion of the lock holder 68 as shown in FIG. 9A (corresponding to the unlocked position of the present invention). On the other hand, when the voltage applied to the solenoid 75 is reduced to Vc, the gap between the engaging projection 70a and the outer peripheral portion of the lock holder 68 decreases to a distance $d_{22}$ as shown in FIG. 9B (corresponding to the near side position of the present invention). At this moment, the engaging projection 70a is not yet brought into contact with the outer peripheral portion of the lock holder 68 and accordingly the lock holder 68 can rotate continuously.

When the ignition switch is not changed from the ON state to the OFF state (i.e. NO in step S11), it is checked whether or not the ignition switch is in the OFF state (refer to step S14). When the ignition switch is in the ON state (i.e. NO in step S14), the locking operation is cancelled (refer to step S21). The steering control section 30 releases the locking pin 70 as shown in FIG. 9A, and executes the processing for the transmission ratio adjustable steering apparatus 1 being in an ordinary condition. When the ignition switch is in the OFF state (i.e. YES in step S14), it is then checked whether or not the locking mechanism is in operation (refer to step S15). When the locking mechanism is not in operation (i.e. NO in step S15), the steering control section 30 terminates this processing immediately.

When the ignition switch is in the OFF state and the locking mechanism is in operation (i.e. YES in step S15), the steering control section 30 then checks in step S16 whether or not it is the time to change the voltage V (i.e. PWM duty ratio) applied to the solenoid 75. When it is the time to change the voltage (i.e. YES in step S16), the steering control section 30 changes the PWM duty ratio so that the voltage applied to the solenoid 75 is reduced by an amount of Vcof (e.g. 0.1V) (refer to step S17). A pulling force of the solenoid 75 decreases by an amount corresponding to a reduction in the applied voltage. In other words, the spring force of the coil spring 71 becomes larger than the pulling force of the solenoid 75 and accordingly the engaging projection 70a of the locking pin 70 shifts toward the lock holder 68 and is held, as a result, at a new balancing point (closer to the lock holder 68). When the voltage change timing has not come yet (i.e. NO in step S16), the steering control section 30 skips the step S17 and proceeds to the next step S18.

According to the voltage characteristics shown in FIG. 5C, the rotational force of the coil spring 71 exceeds the pulling force of the solenoid 75 when the voltage V applied to the solenoid 75 approaches to V1. The coil spring 71 and the solenoid 75 cannot maintain a balanced condition. Accordingly, the engaging projection 70a engages with the engaging recess 68a (refer to FIG. 10).

After the PWM duty ratio is changed, it is checked whether or not the voltage V applied to the solenoid 75 has reduced to V2 (refer to step S18). When the voltage V applied to the solenoid 75 is larger than V2 (NO in step S18), the steering control section 30 terminates this processing. When the voltage V applied to the solenoid 75 is equal to or smaller than V2 (YES in step S18), the steering control section 30 reduces the voltage V applied to the solenoid 75 to 0V (refer to step S19). Then, the steering control section 30 clears the locking flag that indicates the locking mechanism being in operation (refer to step S20).

In this case, voltage V1 is an averaged voltage necessary for the solenoid 75 to maintain the engaged condition of the engaging projection 70a and the engaging recess 68a. Furthermore, voltage V2 is a minimum (or lowest) voltage necessary for the solenoid 75 to maintain the above engaged condition when various differences of constituent components need to be taken into consideration.

Hereinafter, a third example of the steering control program 33p according to the second embodiment of the present invention will be explained with reference to the flowchart of FIG. 8 together with FIGS. 9A, 9B, and 10 and the graph of FIG. 5D. The steering control section 30 (more specifically, CPU31) executes the operational processing for the locking mechanism with this steering control program 33p. First, it is checked whether or not the ignition switch (not shown in the drawing) is changed from the ON state to the OFF state (refer to step S31). When the condition of the ignition switch is changed to the OFF state (i.e. YES in step S31), the steering control section 30 changes the PWM duty ratio so that the voltage V applied to the solenoid 75 decreases linearly at a constant rate from V0 to 0 as shown in FIG. 5D (refer to step S32). More specifically, in response to turning-off action of the ignition switch, the steering control section 30 changes the PWM duty ratio to decrease the voltage V applied to the solenoid 75 by an amount of Vdof. Then, the steering control section 30 sets a locking flag indicating that the locking mechanism is in operation (refer to step S33).

When the ignition switch is not changed from the ON state to the OFF state (i.e. NO in step S31), it is then checked whether or not the ignition switch is in the OFF state (refer to step S34). When the ignition switch is in the ON state (i.e. NO in step S34), the locking operation is cancelled (refer to step S41). The steering control section 30 releases the locking pin 70 as shown in FIG. 9A, and executes the processing for the transmission ratio adjustable steering apparatus 1 being in an ordinary condition. When the ignition switch is in the OFF state (i.e. YES in step S34), it is checked whether or not the locking mechanism is in operation (refer to step S35). When the locking mechanism is not in operation (i.e. NO in step S55), the steering control section 30 terminates this processing immediately.

When the ignition switch is in the OFF state and the locking mechanism is in operation (i.e. YES in step S35), the steering control section 30 checks whether or not it is the time to change the voltage V (i.e. PWM duty ratio) applied to the solenoid 75. When it is the time to change the voltage (i.e. YES in step S36), the steering control section 30 changes the PWM duty ratio so that the voltage V applied to the solenoid 75 decreases by an amount of Vdof (refer to step S37). On the other hand, when the voltage change timing has not come yet (i.e. NO in step S36), the steering control section 30 skips the step S37 and proceeds to the next step S38. Accordingly, a pulling force of the solenoid 75 decreases by an amount corresponding to a reduction in the applied voltage. In other words, the spring force of the coil spring 71 becomes larger than the pulling force of the solenoid 75 and accordingly the engaging projection 70a of the locking pin 70 shifts toward the lock holder 68 and is held, as a result, at a balancing point (closer to the lock holder 68).

According to the voltage characteristics shown in FIG. 5D, the rotational force of the coil spring 71 exceeds the pulling force of the solenoid 75 when the voltage V applied to the solenoid 75 approaches to V1. The coil spring 71 and the solenoid 75 cannot maintain a balanced condition. Accordingly, the engaging projection 70a engages with the engaging recess 68a (refer to FIG. 10).

After the PWM duty ratio is changed, it is checked whether or not the voltage V applied to the solenoid 75 has reduced to 0 (refer to step S38). When the voltage V applied to the solenoid 75 is larger than 0 (NO in step S38), the steering control section 30 terminates this processing. When the voltage V applied to the solenoid 75 is equal to or smaller than 0 (YES in step S38), it is regarded that the voltage V applied to the solenoid 75 is 0V (refer to step S39). Then, the steering control section 30 clears the locking flag that indicates the locking mechanism being in operation (refer to step S40).

In this third example, Vdof represents a decreasing rate (V0/Td) of the voltage V applied to the solenoid 75. Although the Vdof is set to be constant in this example, it is possible to change Vdof at the final stage of the shifting movement of the engaging projection 70a approaching to the lock holder 68 (e.g. when the voltage V decreases below the voltage value V1).

Figure 12:
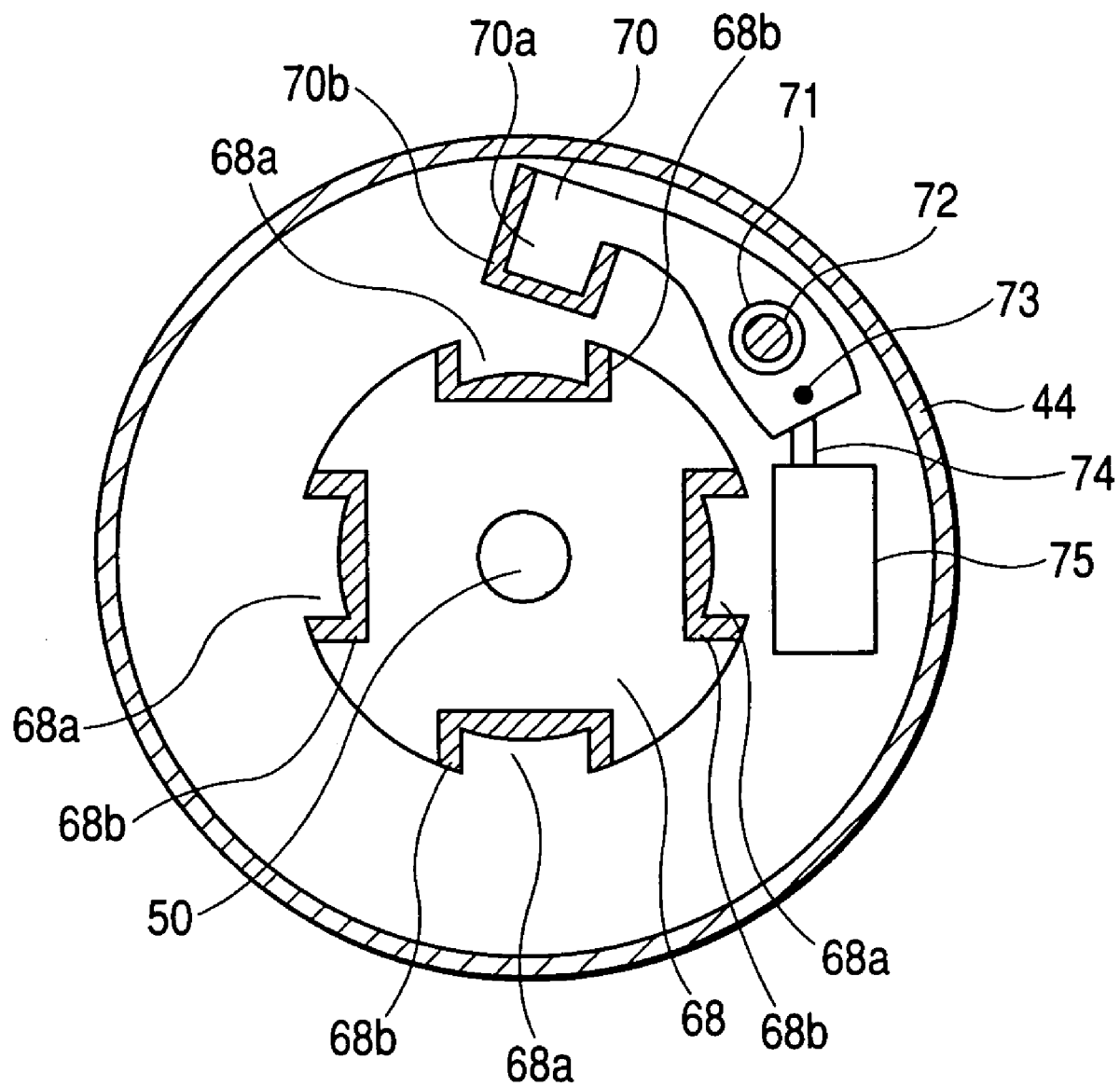
FIG. 12 is a cross-sectional view explaining the operation of a modified locking mechanism incorporated in the transmission ratio changing mechanism in accordance with the second embodiment of the present invention.

Besides the above-described arrangement, as shown in FIG. 12, it is possible to attach a rubber or resilient member 70b to the engaging projection 70a or attach a rubber or resilient member 68b to the engaging recess 68a. In other words, it is desirable to provide a rubber or comparable resilient member to suppress the noise sounds generating when the engaging projection 70a engages with the engaging recess 68a. For example, this arrangement allows the steering control section 30 to use the voltage characteristics shown in FIG. 5A, instead of employing the operational processing for the locking mechanism described above. According to FIG. 5A, when the ignition switch changes from the ON state to the OFF state, the voltage V applied to the solenoid 75 immediately drops to 0V. Even if the voltage V decreases abruptly, the resilient member attached to the engaging projection 70a and/or to the engaging recess 68a can effectively reduce the noise sounds generating when the locking pin 70 engages with the lock holder 68.

Furthermore, although not shown in the drawing, it is possible to constitute the coil spring 71 by a combination of two coil springs which are connected in series and different in their elastic modulus. Using the combination of two coil springs makes it possible to further reduce the noise sounds generating when the engaging projection 70a engages with the engaging recess 68a. According to this arrangement, the coil spring having a larger elastic modulus rotates first and then the coil spring having a smaller elastic modulus rotates next. In other words, the shifting speed of the locking pin 70 becomes small at the final stage of the rotating process of the composite coil spring 71. This is effective in absorbing the shock (and accordingly in suppressing the noise sounds) occurring in the engagement of the engaging projection 70a and the engaging recess 68a. For example, this arrangement allows the steering control section 30 to use the voltage characteristics shown in FIG. 5A, instead of employing the operational processing for the locking mechanism described above. As described above, according to FIG. 5A, the voltage V applied to the solenoid 75 immediately drops to 0V in response to turning-off action of the ignition switch. Even if the voltage V decreases abruptly, the composite coil spring 71 consisting of two coil springs that are connected in series and different in their elastic modulus can effectively reduce the noise sounds generating when the locking pin 70 engages with the lock holder 68.

Furthermore, it is possible to employ both of the above-proposed arrangements. In this case, a rubber or resilient member is attached to at least one of the engaging projection 70a of the locking pin 70 and the engaging recess 68a or the lock holder 68. The coil spring 71 is constituted by a combination of two coil springs which are connected in series and different in their elastic modulus. This is effective in further reducing the noise sounds generating when the engaging projection 70a engages with the engaging recess 68a. For example, this arrangement allows the steering control section 30 to use the voltage characteristics shown in FIG. 5A, instead of employing the operational processing for the locking mechanism described above. As described above, according to FIG. 5A, the voltage V applied to the solenoid 75 immediately drops to 0V in response to turning-off action of the ignition switch. Even if the voltage V decreases abruptly, the resilient member attached to the engaging projection 70a and/or to the engaging recess 68a and the composite coil spring 71 consisting of two coil springs that are connected in series and different in their elastic modulus can effectively reduce noise sounds generating when the locking pin 70 engages with the lock holder 68.

The above-described embodiments of the present invention are mere practical examples, and accordingly the present invention is not limited to these embodiments and can be modified in various ways without departing from the scope of the present invention.

What is claimed is:

1. A transmission ratio adjustable steering apparatus, comprising:
   an input shaft connected to a steering wheel,
   an output shaft connected to a steerable wheel,
   a transmission ratio changing mechanism for changing a ratio of a rotational angle of said output shaft to a rotational angle of said input shaft,
   a coupling member shiftable between a locked position and an unlocked position, so that said input shaft and said output shaft integrally rotate when said coupling member is in said locked position, while said input shaft and said output shaft are released from a coupling condition and brought into an unlocked condition where the transmission ratio of the rotational angle of said output shaft to the rotational angle of said input shaft is adjustable by said transmission ratio changing mechanism when said coupling member is in said unlocked position, a resilient member for resiliently urging said coupling member toward said locked position, a solenoid for holding said coupling member at said unlocked position against a resilient force of said resilient member, and a solenoid drive control apparatus for applying a drive voltage to said solenoid to hold said coupling member positioned at said unlocked position and reducing said drive voltage through a voltage attenuation process before said coupling member finally reaches said locked position, so that during said voltage attenuation process said solenoid produces an electromagnetic force yielding to the resilient force of said resilient member and decreasing a shifting speed of said coupling member on the way to said locked position.

2. The transmission ratio adjustable steering apparatus in accordance with claim 1, wherein said solenoid drive control apparatus, in the process of shifting said coupling member from said unlocked position to said locked position, gradually reduces said drive voltage applied to said solenoid to allow said coupling member to finally reach said locked position.

3. The transmission ratio adjustable steering apparatus in accordance with claim 1, wherein said solenoid drive control apparatus, in the process of shifting said coupling member from said unlocked position to said locked position, reduces said drive voltage applied to said solenoid so that an electromagnetic force of said solenoid balances with a resilient force of said resilient member at a near side of said locked position to momentarily stop said coupling member at said near side before said coupling member reaches said locked position, and then finally decreases a value of said drive voltage to zero.

4. The transmission ratio adjustable steering apparatus in accordance with claim 1, wherein a housing integrally rotates with said input shaft, said transmission ratio changing mechanism is a transmission ratio changing motor that is fixed in said housing and has a rotary shaft for transmitting motor rotation to said output shaft via a speed reduction gear unit, a rotary member is formed coaxially and integrally with said rotary shaft of said transmission ratio changing motor and has at least one engaging recess formed on an outer circumferential surface thereof, said coupling member has an engaging hook that is attached to said housing so as to oppose to the outer circumferential surface of said rotary member and is shiftable between said locked position where said engaging hook engages with said engaging recess and said unlocked position where said engaging hook disengages from said engaging recess and keeps a predetermined distance from the outer circumferential surface of said rotary member, said resilient member resiliently urges said coupling member toward said locked position where the engaging hook of said coupling member engages with the engaging recess of said rotary member, said solenoid shifts said coupling member against the resilient force of said resilient member and holds said coupling member at said unlocked position where the engaging hook of said coupling member disengages from said engaging recess of said rotary member and keeps a predetermined distance from the outer circumferential surface of said rotary member, and said solenoid drive control apparatus, in said voltage attenuation process, causes said coupling member held at said unlocked position to shift toward said locked position based on the resilient force of said resilient member, thereby integrating said input shaft with the rotary shaft of said transmission ratio changing motor via said housing, and causing said input shaft and said output shaft to rotate integrally via said speed reduction gear unit.

* * * * *